US012589594B2

(12) United States Patent
Nagashima et al.

(10) Patent No.: US 12,589,594 B2
(45) Date of Patent: Mar. 31, 2026

(54) CARTRIDGE

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 220 days.

(21) Appl. No.: 18/394,313

(22) Filed: Dec. 22, 2023

(65) Prior Publication Data

US 2024/0208234 A1 Jun. 27, 2024

(30) Foreign Application Priority Data

Dec. 23, 2022 (JP) ................................. 2022-206876

(51) Int. Cl.
*B41J 2/175* (2006.01)

(52) U.S. Cl.
CPC ....... *B41J 2/17523* (2013.01); *B41J 2/17553* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17526; B41J 2/17553
See application file for complete search history.

(56) References Cited

U.S. PATENT DOCUMENTS 5,949,459 A * 9/1999 Gasvoda ................ B41J 2/1752 347/86
6,488,369 B1 * 12/2002 Steinmetz ............ B41J 2/17523 347/50
7,686,441 B2 * 3/2010 Hashii .................. B41J 2/17503 347/50
7,950,789 B2 * 5/2011 Matsumoto .......... B41J 2/17553 347/49
2012/0056955 A1 * 3/2012 Kodama ................ B41J 2/1752 347/86
2012/0200646 A1 * 8/2012 Karasawa ............ B41J 2/17523 347/86

FOREIGN PATENT DOCUMENTS

JP 2022-053794 A 4/2022
WO 2022/065203 A1 3/2022

* cited by examiner

*Primary Examiner* — Anh T Vo
(74) *Attorney, Agent, or Firm* — Oliff PLC

(57) ABSTRACT

The cartridge is attached to the cartridge attachment through an attaching operation in which the cartridge is completely inserted into the cartridge attachment in an insertion direction, or a horizontal direction, and then a rear portion of the cartridge in the insertion direction is moved in a rotation attaching direction containing a gravity-directional component with a deep side of the cartridge in the insertion direction used as a rotation fulcrum. This cartridge includes: a main body a liquid reservoir that is disposed inside the main body; a liquid inlet that is formed across the main body and leads to an interior of the liquid reservoir; a liquid reservoir body that includes a liquid supply section through which communicates with the liquid reservoir; and an adapter that is mounted on the liquid reservoir body and has an insertion aperture into which the liquid introduction section is to be inserted.

5 Claims, 16 Drawing Sheets

CARTRIDGE

The present application is based on, and claims priority from JP Application Serial Number 2022-206876, filed Dec. 23, 2022, the disclosure of which is hereby incorporated by reference herein in its entirety.

BACKGROUND

1. Technical Field

The present disclosure relates to cartridge techniques.

2. Related Art

JP-A-2022-053794 discloses a cartridge for a printing apparatus. This cartridge includes: a liquid reservoir body; and an adapter mounted on the liquid reservoir body. To attach the cartridge to a cartridge attachment in the printing apparatus, a user needs to insert the cartridge into the cartridge attachment in an insertion direction, the insertion direction being a horizontal direction, and then to move the cartridge in a coupling direction containing a gravity-directional component with its deep side in the insertion direction used as a rotation fulcrum. The liquid reservoir body includes: a liquid reservoir that stores a liquid; and a liquid supply section through which the liquid stored in the liquid reservoir is to be supplied to a liquid introduction section in the printing apparatus. The liquid supply section is provided with a valve mechanism that opens/closes in an internal flow path along which the liquid flows. This valve mechanism includes a valve seat, a valve body, and a biasing member which, in an attached state where the cartridge is attached to the cartridge attachment, are arranged in this order from the supply end of the liquid supply section which is disposed adjacent to the liquid introduction section. The valve seat is an annular elastic material; the valve body is a pillar member and closes a valve hole formed in the valve seat; and the biasing member biases the valve body toward the valve seat. During an operation of attaching the cartridge to the cartridge attachment in the printing apparatus, the liquid introduction section pushes the valve body away from the valve seat, thereby causing the valve mechanism to open. In response, the liquid stored in the liquid reservoir is supplied to the printing apparatus.

In the technique disclosed above, when pouring the liquid into the liquid reservoir, it is necessary to open the valve mechanism in the liquid supply section. Therefore, there is a need for a technique to more efficiently pour the liquid into the liquid reservoir.

SUMMARY

The present disclosure is a cartridge to be detachably attached to a cartridge attachment in a printing apparatus. The cartridge is attached to the cartridge attachment through an attaching operation in which the cartridge is completely inserted into the cartridge attachment in an insertion direction, the insertion direction being a horizontal direction, and then a rear portion of the cartridge in the insertion direction is moved in a rotation attaching direction containing a gravity-directional component with a deep side of the cartridge in the insertion direction used as a rotation fulcrum. This cartridge includes: a main body that forms an outer envelope; a liquid reservoir that stores liquid to be supplied to the printing apparatus, a liquid reservoir being disposed inside the main body; a liquid inlet formed across the main body, the liquid inlet leading to an interior of the liquid reservoir; a liquid reservoir body that includes a liquid supply section through which the liquid is to be supplied to a liquid introduction section in the cartridge attachment, the liquid supply section communicating with the liquid reservoir; and an adapter mounted on the liquid reservoir body, the adapter having an insertion aperture into which the liquid introduction section is to be inserted.

DESCRIPTION OF EMBODIMENTS

A. First Embodiment

A-1. Configuration of Print System

Figure 1:
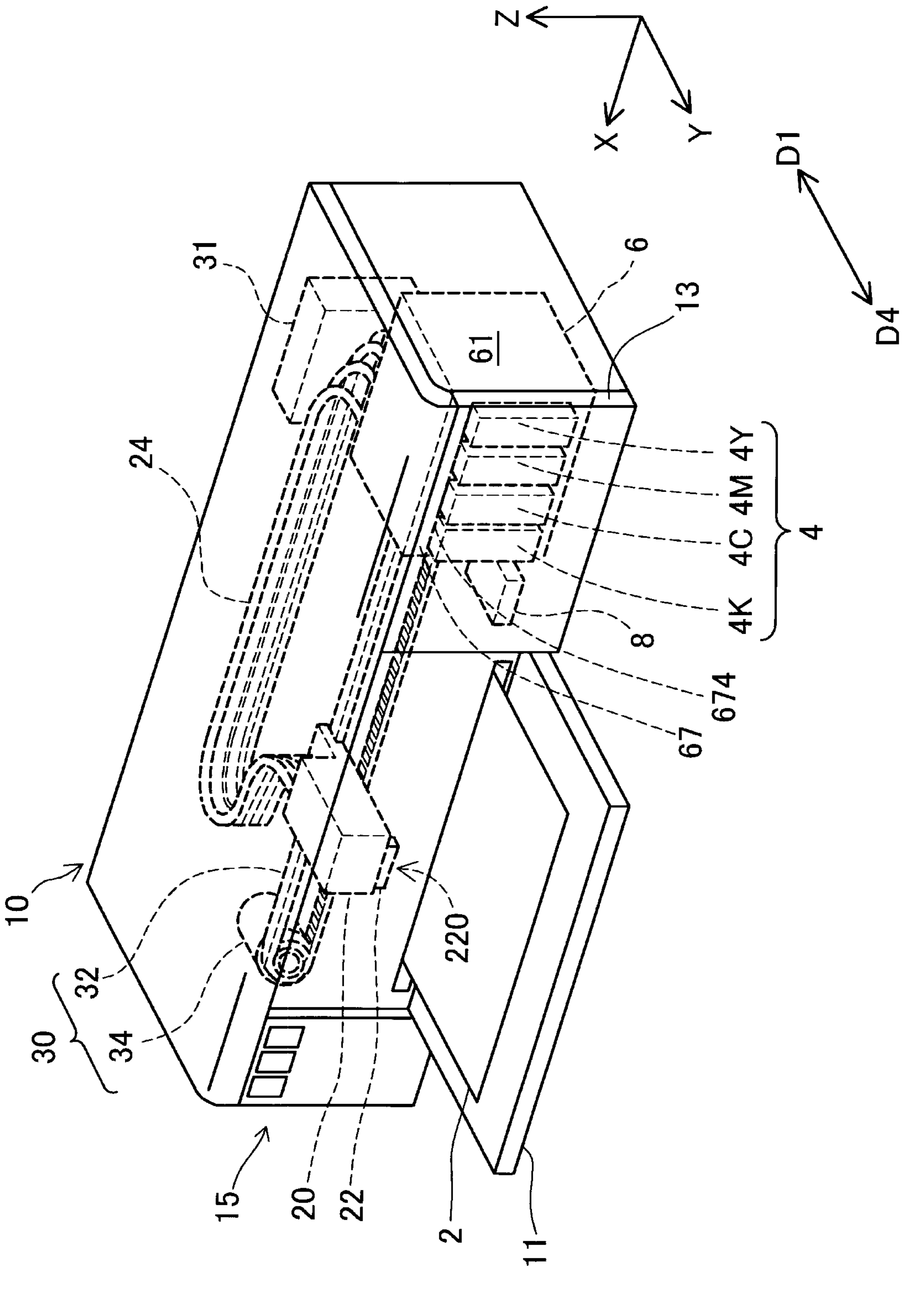
FIG. 1 is a perspective view of a schematic configuration of a print system according to a first embodiment of the present disclosure.

FIG. 1 is a perspective view of a schematic configuration of a print system 1 according to a first embodiment of the present disclosure. In FIG. 1, an X-axis, a Y-axis, and a Z-axis are present as three spatial axes orthogonal to one another. The direction in which the arrow of the X-axis points corresponds to the positive direction along the X-axis; the direction in which the arrow of the Y-axis points corresponds to the positive direction along the Y-axis; and the direction in which the arrow of the Z-axis points corresponds to the positive direction along the Z-axis. The positive direction along the X-axis is referred to as the +X direction; the positive direction along the Y-axis is referred to as the +Y direction; and the positive direction along the Z-axis is referred to as the +Z direction. The direction opposite to that in which the arrow of the X-axis points corresponds to the negative direction along the X-axis; the direction opposite to that in which the arrow of the Y-axis points corresponds to the negative direction along the Y-axis; and the direction opposite to that in which the arrow of the Z-axis points corresponds to the negative direction along the Z-axis. The negative direction along the X-axis is referred to as the −X direction; the negative direction along the Y-axis is referred to as the −Y direction; and the negative direction along the Z-axis is referred to as the −Z direction. An arbitrarily one of the directions along the X-axis is referred to as the X direction; an arbitrarily one of the directions along the Y-axis is referred to as the Y direction; and an arbitrarily one of the directions along the Z-axis is referred to as the Z direction.

In this embodiment, when the print system 1 is installed inside the space along the X-, Y-, Z-axes, the X- and Y-axes define the horizontal plane, and the Z-axis extends in the gravitational direction. Hereinafter, the gravitational direction is defined as the −Z direction, whereas the opposite direction is defined as the +Z direction. The direction from the front to the rear of the print system 1 is defined as the −Y direction, whereas the direction from the rear to the front of the print system 1 is defined as the +Y direction. The direction from the right to the left of the print system 1 when the print system 1 is seen from the front is defined as the +X direction, whereas the direction from the left to the right of the print system 1 when the print system 1 is seen from the front is defined as the −X direction. The "usage state of the print system 1" corresponds to the state where the print system 1 is installed on the horizontal plane. Those definitions are applicable to the drawings and description that will be described below.

The print system 1 includes: a printing apparatus 10; and one or more cartridges 4, each of which supplies a liquid (ink) to the printing apparatus 10.

In this embodiment, the printing apparatus 10 may an ink jet printer that discharges the liquid, or the ink, from an ejecting head 22. The printing apparatus 10 includes a cartridge attachment 6, a controller 31, a carriage 20, an ejecting head 22, and a driving mechanism 30. In addition, the printing apparatus 10 includes operation buttons 15 to be used for a user to operate the printing apparatus 10.

The cartridge attachment 6 has a first apparatus wall 67 on its +Y-directional side. The first apparatus wall 67 is provided with an insertion/removal aperture 674 via which a storage chamber 61 for the cartridges 4 is accessible. The cartridges 4 can be mounted inside or removed from the storage chamber 61 in the cartridge attachment 6 via the insertion/removal aperture 674. In this embodiment, a cartridge 4 can be inserted into the cartridge attachment 6 in an insertion direction D1, which is identical to the −Y direction in this case, and then attached thereto. The cartridge 4, in turn, can be detached from the cartridge attachment 6 in a removal direction D4, which is identical to the +Y direction in this case. Of the cartridge attachment 6, the −Y-directional side is referred to as the deep side, and a portion on the +Y-directional side is referred to as the rear portion.

The cartridge attachment 6 supports attaching/detaching of one or more cartridges 4 thereto. In this embodiment, the cartridge attachment 6 supports attaching of four types of, namely, four cartridges 4 thereto in relation to black, cyan, magenta, and yellow inks. Of the cartridges 4, one contains black ink is referred to as the first cartridge 4K, one contains cyan ink is referred to as the second cartridge 4C, one contains magenta ink is referred to as the third cartridge 4M, and one contains yellow ink is referred to as the fourth cartridge 4Y. In this embodiment, the first cartridge 4K, the second cartridge 4C, the third cartridge 4M, and the fourth cartridge 4Y are arranged side by side in the X direction. However, the number of types of the cartridges 4 and the physical number of the cartridges 4 that can be mounted inside the storage chamber 61 of the cartridge attachment 6 are not limited to those in this embodiment.

The printing apparatus 10 further includes a replacement cover 13 on the front panel on the +Y-directional side. The replacement cover 13 is openable and closable. By opening the replacement cover 13, the aperture in the cartridge attachment 6 is exposed so that a cartridge 4 can be attached to or detached from the cartridge attachment 6. Once a cartridge 4 is attached to the cartridge attachment 6, the ink starts flowing from the cartridge 4 to the ejecting head 22 disposed on the carriage 20 through a tube 24, which serves as a liquid flow pipe in which the ink flows. In an alternative embodiment, the printing apparatus 10 may further include a pump mechanism (not illustrated), which supplies the ink from the cartridge 4 to the ejecting head 22 by sucking the ink. A plurality of tubes 24 may be disposed in relation to respective types of ink.

The ejecting head 22 is provided with a predetermined number of nozzles 220 for each type of ink. The ejecting head 22 discharges the ink to a print sheet 2 through the corresponding nozzles 220, thereby printing desired letters, images, and other data. In this embodiment, the printing apparatus 10 is an off-carriage type of printer in which a cartridge attachment 6 does not move together with a carriage 20. However, the technique of the present disclosure is also applicable to an on-carriage type of printer in which a carriage 20 moves together with a cartridge attachment 6 mounted on the carriage 20.

The controller 31 controls individual sections in the printing apparatus 10 and transmits/receives signals to or from the respective cartridges 4. The carriage 20 moves the ejecting head 22 relative to the print sheet 2.

The driving mechanism 30 causes the carriage 20 to reciprocate in accordance with a control signal from the controller 31. The driving mechanism 30 includes a timing belt 32 and a driving motor 34. The driving motor 34 transmits its power to the carriage 20 through the timing belt 32, thereby moving the carriage 20 in main scanning directions, which are identical to the ±X directions in this case. The printing apparatus 10 further includes a transport mechanism that moves the print sheet 2 in sub-scanning directions, which are identical to ±Y directions in this case. During the print operation, the transport mechanism moves the print sheet 2 in one of the sub-scanning directions, which is identical to the +Y direction. After the print operation has been completed, the transport mechanism outputs the print sheet 2 to the upper surface of a front cover 11.

A-2. Detailed Configuration of Cartridge Attachment

Figure 2:
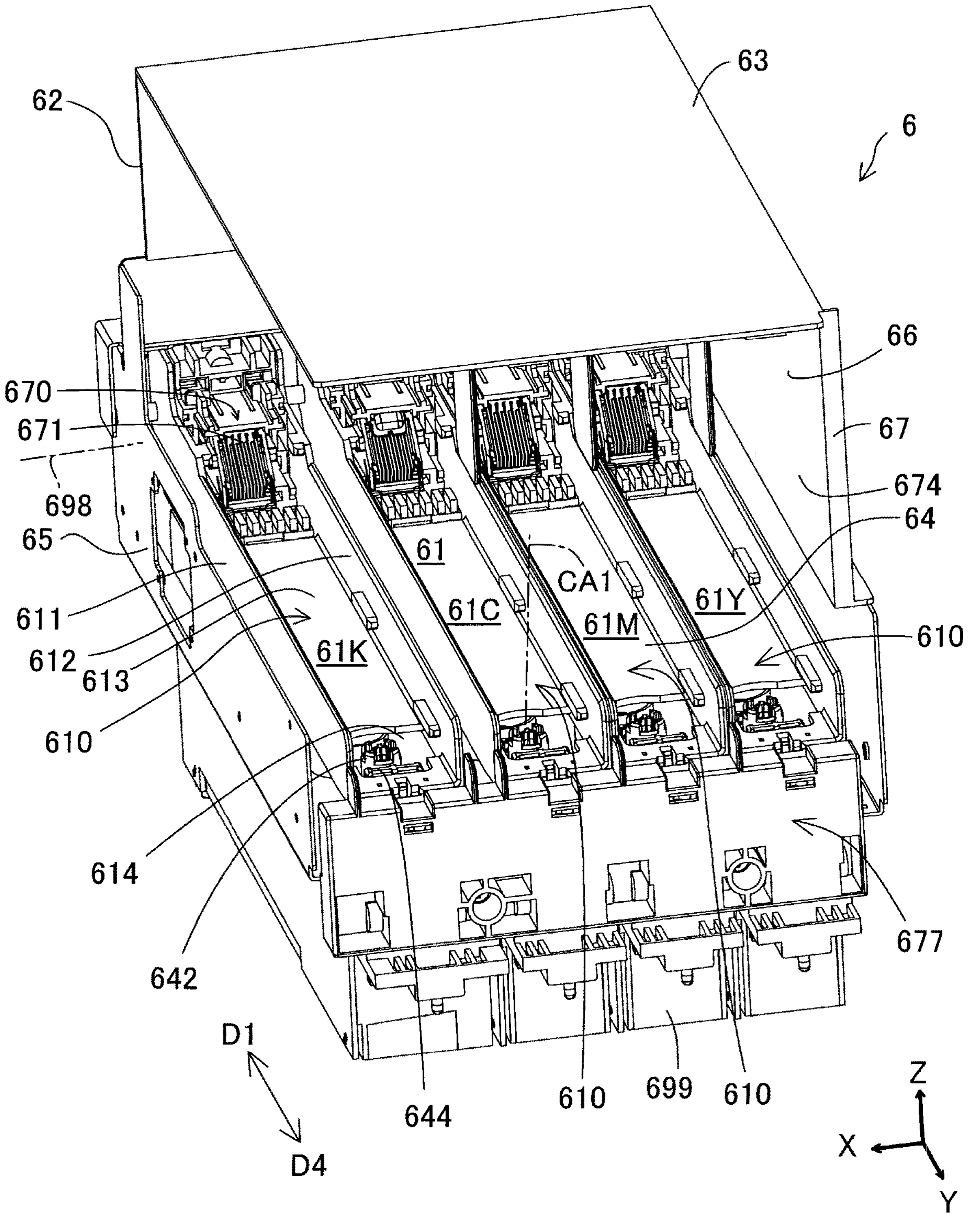
FIG. 2 is a perspective view of the cartridge attachment.
Figure 3:
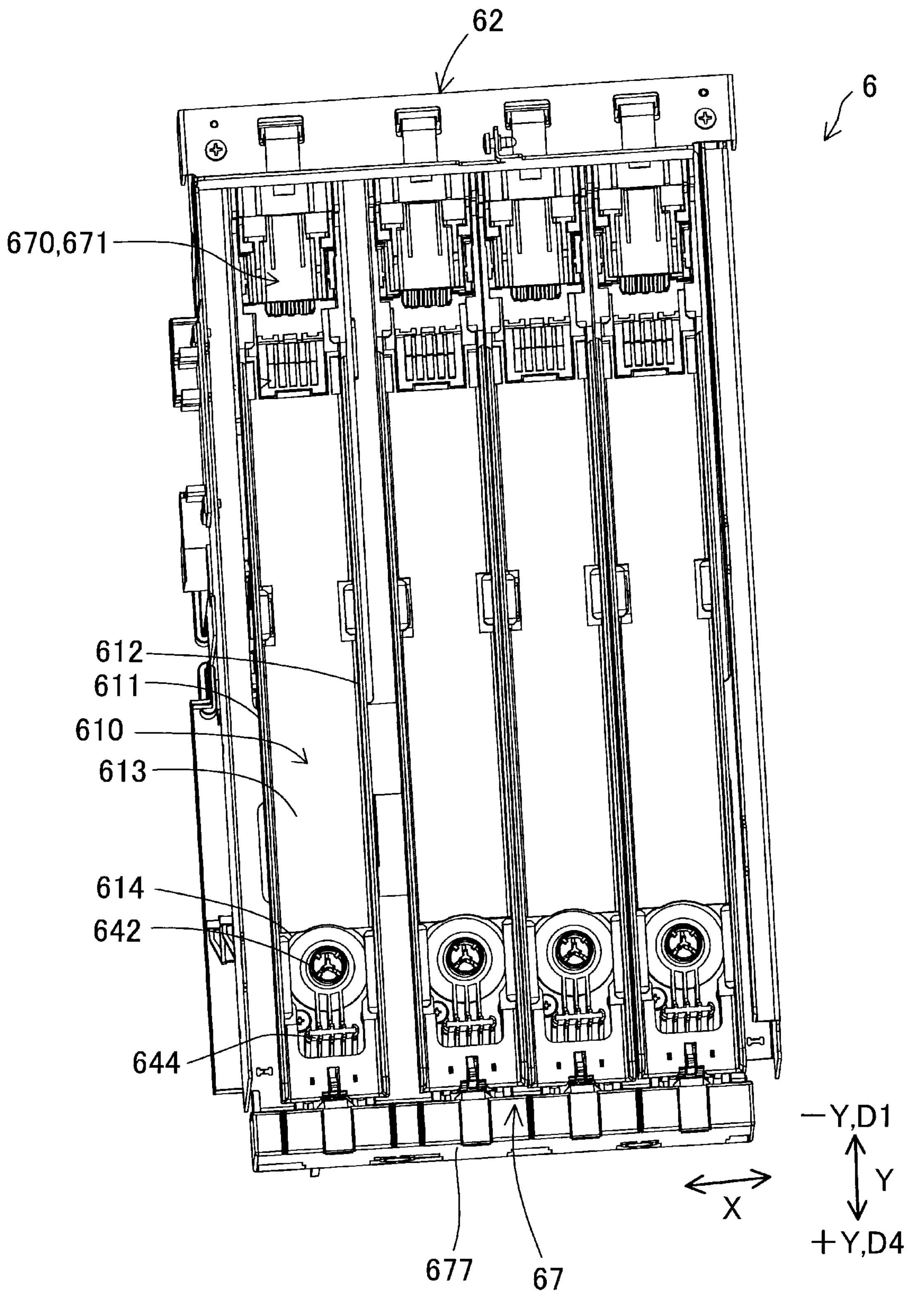
FIG. 3 is a plan view of the cartridge attachment as seen from the +Z-directional side.

FIG. 2 is a perspective view of the cartridge attachment 6; FIG. 3 is a plan view of the cartridge attachment 6 as seen from the +Z-directional side. In both FIGS. 2 and 3, some components of the cartridge attachment 6 are omitted for easy understanding of the configuration. For the cartridge attachment 6, the X direction is also referred to as the width direction, the Y direction is also referred to as the depth direction, and the Z direction is also referred to as the height direction. Hereinafter, the components of the cartridge attachment 6 will be described on the assumption that cartridge attachment 6 is in an initial placement state where the cartridge 4 is not attached to cartridge attachment 6 unless otherwise stated.

The cartridge attachment 6 includes a storage chamber 61 in which one or more cartridges 4 are to be mounted. In this embodiment, the storage chamber 61 may have a substantially cubic shape. Inside the storage chamber 61, a slot 61K on which the first cartridge 4K is to be mounted substantially conforms to the outer shape of the first cartridge 4K illustrated in FIG. 1. Likewise, a slot 61C on which the second cartridge 4C is to be mounted substantially conforms to the outer shape of the second cartridge 4C; a slot 61M on which the third cartridge 4M is to be mounted substantially conforms to the outer shape of the third cartridge 4M; and a slot 61Y on which the fourth cartridge 4Y is to be mounted substantially conforms to the outer shape of the fourth cartridge 4Y.

As illustrated in FIG. 2, the cartridge attachment 6 further includes six apparatus walls: a second apparatus wall 62, an apparatus top wall 63, an apparatus bottom wall 64, a first apparatus side wall 65, a second apparatus side wall 66, and a first apparatus wall 67, all of which surround the storage chamber 61. The "wall" described herein conceptionally implies not only a single wall but also a plurality of continuous walls. The first apparatus wall 67 forms the insertion/removal aperture 674 via which a cartridge 4 is inserted into or removed from the storage chamber 61. The second apparatus wall 62 faces the first apparatus wall 67 in the Y direction and forms a wall of the storage chamber 61 on its −Y-directional side. The second apparatus wall 62 is a wall substantially parallel to the plane expanding in the Z direction when the printing apparatus 10 is installed on the floor.

The apparatus top wall 63 corresponds to the wall of the storage chamber 61 on its +Z-directional side. The apparatus bottom wall 64 faces the apparatus top wall 63 in the Z direction and corresponds to the wall of the storage chamber 61 on its −Z-directional side. The apparatus bottom wall 64 is formed of a plurality of support members 610. The apparatus bottom wall 64 has a plurality of apparatus apertures 614 formed in the respective slots 61K, 61C, 61M, and 61Y. In this embodiment, four apparatus apertures 614 may be formed in the respective slots 61K, 61C, 61M, and 61Y. Each of the apparatus top wall 63 and the apparatus bottom wall 64 intersects both the first apparatus wall 67 and the second apparatus wall 62. Herein, the "intersect" means one of the states (i) to (iii):

(i) a first component intersects a second component;

(ii) a first component intersects a second component if one of the first and second components extends; and (iii) a first component intersects a second component if both of the first and second components extend.

The first apparatus side wall 65 corresponds to the wall of the storage chamber 61 on its +X-directional side. The second apparatus side wall 66 faces the first apparatus side wall 65 in the X direction and corresponds to the wall of the storage chamber 61 on its −X-directional side. Each of the first apparatus side wall 65 and the second apparatus side wall 66 intersects all of the first apparatus wall 67, the second apparatus wall 62, the apparatus top wall 63, and the apparatus bottom wall 64.

As illustrated in FIGS. 2 and 3, the cartridge attachment 6 further includes the support members 610, a plurality of liquid introduction sections 642, a plurality of liquid storage sections 699, a plurality of apparatus-side positioning sections 644, a plurality of apparatus-side terminal sections 670, and an engagement forming body 677.

Each of the support members 610 has a main wall 613 that forms the apparatus bottom wall 64, a first support side wall 611, and a second support side wall 612. The main wall 613 has a bottom recessed toward its −Z-directional side. The main wall 613 is provided with the apparatus aperture 614 on its +Y-directional side, or on the +Y-directional side of the first apparatus wall 67. The apparatus aperture 614 is formed across the main wall 613 in the Z direction, or in the thickness direction of the main wall 613. The first support side wall 611 is erected in the +Z direction from the +X-directional edge of the main wall 613, whereas the second support side wall 612 is erected in the +Z direction from the −X-directional edge of the main wall 613. The first support side wall 611 faces the second support side wall 612 in the X direction.

The liquid introduction sections 642 receive the liquid, or the ink, supplied from liquid supply sections 442 (see FIG. 4) in the respective cartridges 4. As illustrated in FIG. 2, each of the liquid introduction sections 642 protrudes along an introduction section side center axis CA1. The liquid introduction sections 642 are disposed on one of the surfaces of the support member 610 which is farther from the storage chamber 61.

Figure 4:
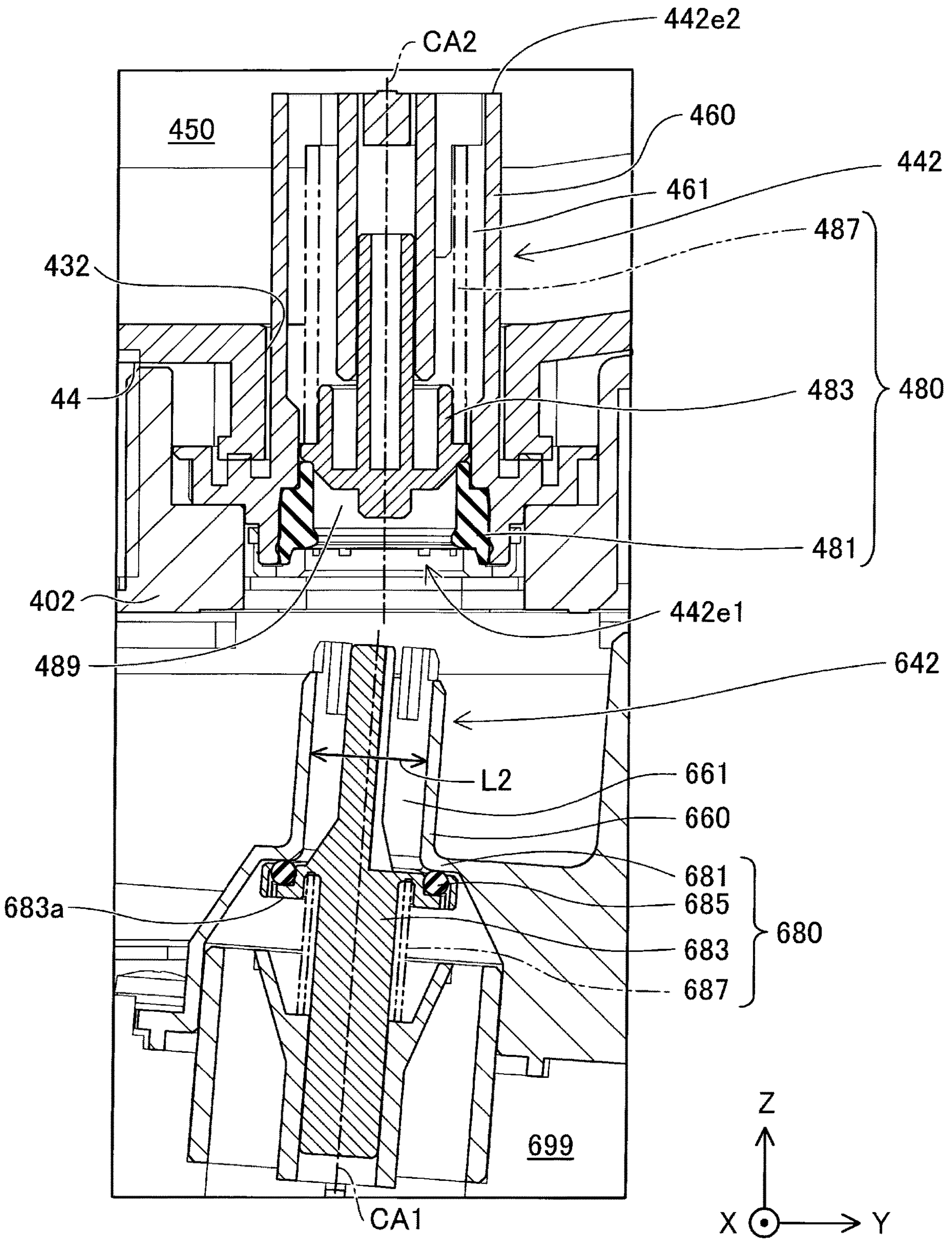
FIG. 4 is a detailed cross-sectional view of a liquid introduction section in the cartridge attachment and a liquid supply section in a cartridge.

FIG. 4 is a detailed cross-sectional view of a liquid introduction section 642 in the cartridge attachment 6 and the liquid supply section 442 in a cartridge 4. In FIG. 4, the liquid introduction section 642 is not coupled to the liquid supply section 442. Details of the liquid supply section 442 will be described later. The liquid introduction section 642 includes: an internal flow path 661 through which the liquid, or the ink, flows; an introduction section main body 660 that forms the internal flow path 661; and an apparatus flow path valve mechanism 680 that opens/closes in the internal flow path 661. The liquid introduction section 642 has an inner diameter L2, which is substantially equal to a flow path diameter of the internal flow path 661.

The introduction section main body 660 forms an outer envelope of the liquid introduction section 642. The internal flow path 661 communicates with a corresponding one of the liquid storage sections 699. The apparatus flow path valve mechanism 680 is disposed inside the internal flow path 661. The apparatus flow path valve mechanism 680 includes: an apparatus-side valve seat 681, which is a portion of the introduction section main body 660; an apparatus-side valve body 683; a seal member 685; and an apparatus-side biasing member 687.

The apparatus-side valve seat 681 is a component that moves toward or away from the apparatus-side valve body 683 with the seal member 685 therebetween. The apparatus-side valve body 683 is a cylindrical member that extends along the introduction section side center axis CA1. The apparatus-side valve body 683 has an open/close section 683*a* with an annular shape, which expands outwardly in a radial direction. The open/close section 683*a* faces the apparatus-side valve seat 681 in a direction along the introduction section side center axis CA1. The seal member 685 is disposed on one of the surfaces of the open/close section 683*a* which is closer to the apparatus-side valve seat 681. The seal member 685 has an annular shape. The apparatus-side biasing member 687 biases the open/close section 683*a* toward the apparatus-side valve seat 681. The apparatus-side biasing member 687 may be a compression spring disposed on one of the surfaces of the open/close section 683*a* which is farther from the apparatus-side valve seat 681.

When the liquid introduction section 642 is not coupled to the liquid supply section 442, the apparatus flow path valve mechanism 680 is in a closed state where the open/close section 683*a* abuts against the apparatus-side valve seat 681 with the seal member 685 therebetween by means of the biasing force of the device side biasing member 687. In this case, the internal flow path 661 is in a non-communicating state. When the liquid introduction section 642 is coupled to the liquid supply section 442, the apparatus flow path valve mechanism 680 is in an open state where the apparatus-side valve body 683 is pressed by a cartridge-side valve body 483 (described later) in the liquid supply section 442 and thus displaced apart from the apparatus-side valve seat 681. In response, the apparatus flow path valve mechanism 680 opens to make the internal flow path 661 enter a communicating state. The ink stored in the cartridge 4 is thereby supplied to the liquid introduction section 642 through the liquid supply section 442. While the ink is supplied from the cartridge 4 to the printing apparatus 10, air-liquid exchange is performed in the liquid reservoir 450 of the cartridge 4 which stores the ink. During this air-liquid exchange, for example, the ink is supplied from the liquid supply section 442 to the liquid introduction section 642 while air contained in the liquid storage section 699 turns out to be bubbles, which then enter a corresponding one of the liquid reservoirs 450 through the liquid introduction section 642 and the liquid supply section 442.

The liquid storage section 699 stores the liquid that has been supplied from the cartridge 4 through the liquid introduction section 642. The liquid storage section 699 is maintained at a predetermined pressure, such as a negative pressure. If the liquid storage section 699 is maintained at a predetermined negative pressure, the ink is supplied to the ejecting head 22, depending on the difference between the height of the ejecting head 22 and the ink level in the liquid storage section 699. More specifically, the ink stored in the cartridge 4 is poured into the liquid storage section 699 through the liquid introduction section 642 in response to the lowering of the ink level in the liquid storage section 699. In this way, the ink level in the liquid storage section 699 is maintained constant.

Each of the apparatus-side positioning sections 644 illustrated in FIG. 2 can engage with a cartridge-side supply section positioning unit 448 (see FIG. 8) in a corresponding one of the cartridges 4, thereby suppressing the liquid supply section 442 in the cartridge 4 from being displaced relative to the liquid introduction section 642. In this embodiment, each apparatus-side positioning section 644 may be a substantially rectangular projection.

Each of the apparatus-side terminal sections 670 is a mechanism for electrically connecting the cartridge 4 to the printing apparatus 10 when a corresponding one of the cartridges 4 is attached to the cartridge attachment 6. Each apparatus-side terminal section 670 has a plurality of apparatus-side terminals 671 to be brought into contact with respective cartridge-side terminals 521 (see FIG. 8) in a corresponding one of the cartridges 4.

The engagement forming body 677 is formed on the first apparatus wall 67, which is positioned closer to the +Y-directional side than the support member 610 is. In addition, the engagement forming body 677 is positioned closer to the −Z-directional side of the cartridge attachment 6 than the insertion/removal aperture 674 is. The engagement forming body 677 is one or more attachment engagement sections related to the slots 61K, 61C, 61M, and 61Y. In this case, four elastic attachment engagement sections (not illustrated) may be arranged.

A-3. Process of Attaching/Detaching Cartridge To or From Cartridge Attachment

Figure 5:
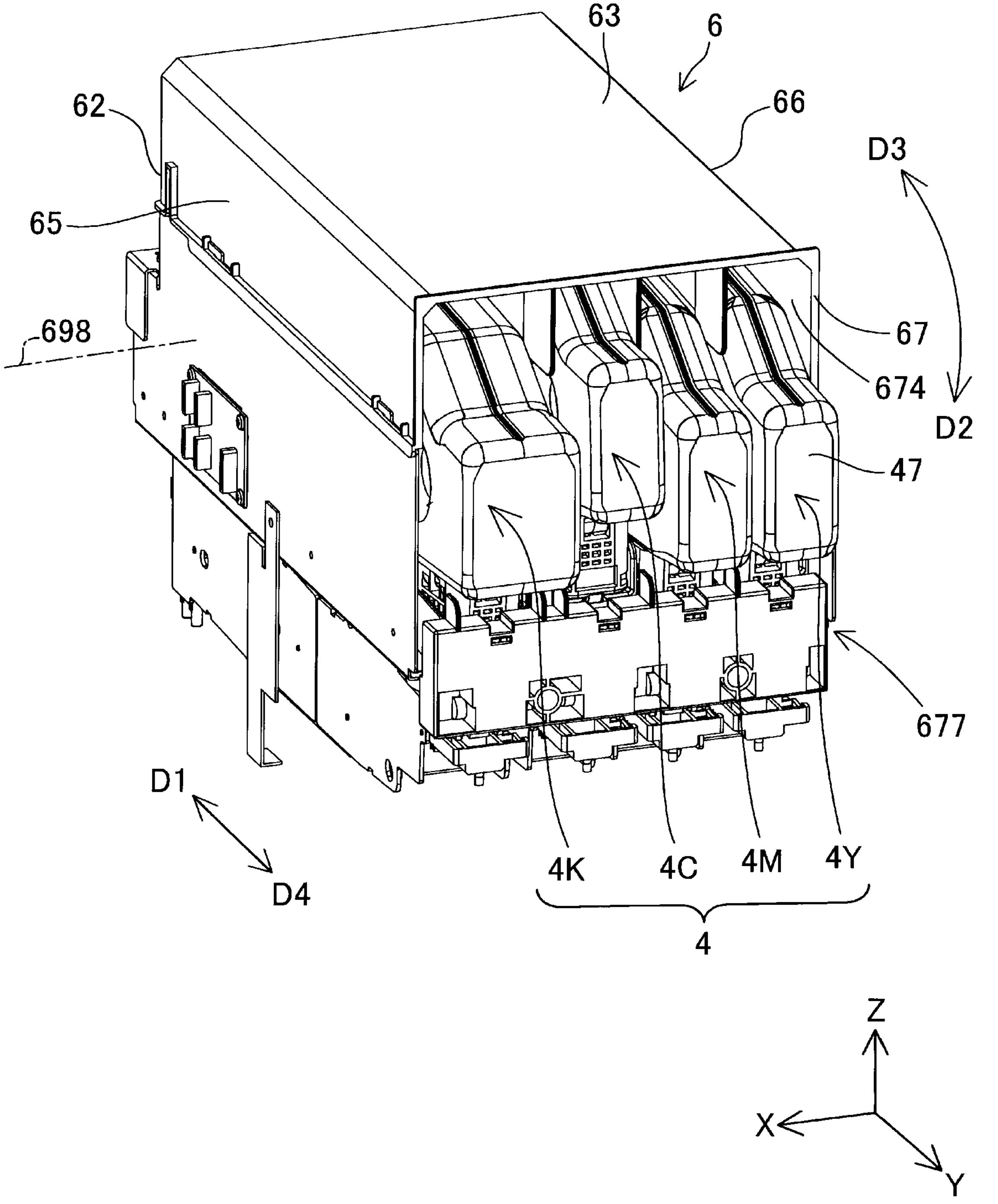
FIG. 5 is an explanatory view of a process of attaching/detaching the cartridges to or from the cartridge attachment.

FIG. 5 is an explanatory view of a process of attaching/detaching the cartridges 4 to or from the cartridge attachment 6. In FIG. 5, the second cartridge 4C, which is one of the four cartridges 4, is in an "insertion-completed state" where the second cartridge 4C has been completely inserted into the cartridge attachment 6. In this insertion-completed state, the second cartridge 4C is inserted into the cartridge attachment 6 but the liquid supply section 442 in the second cartridge 4C is not coupled to a corresponding liquid introduction section 642 in the cartridge attachment 6. In FIG. 5, the first cartridge 4K, the third cartridge 4M, and the fourth cartridge 4Y are in an "attached state" where all of the first cartridge 4K, the third cartridge 4M, and the fourth cartridge 4Y have been completely attached to the cartridge attachment 6. In this attached state, the first cartridge 4K, the third cartridge 4M, and the fourth cartridge 4Y are inserted into and attached to the cartridge attachment 6 so that the liquid, or the ink, can be supplied from the first cartridge 4K, the third cartridge 4M, and the fourth cartridge 4Y to the printing apparatus 10.

Figure 6:
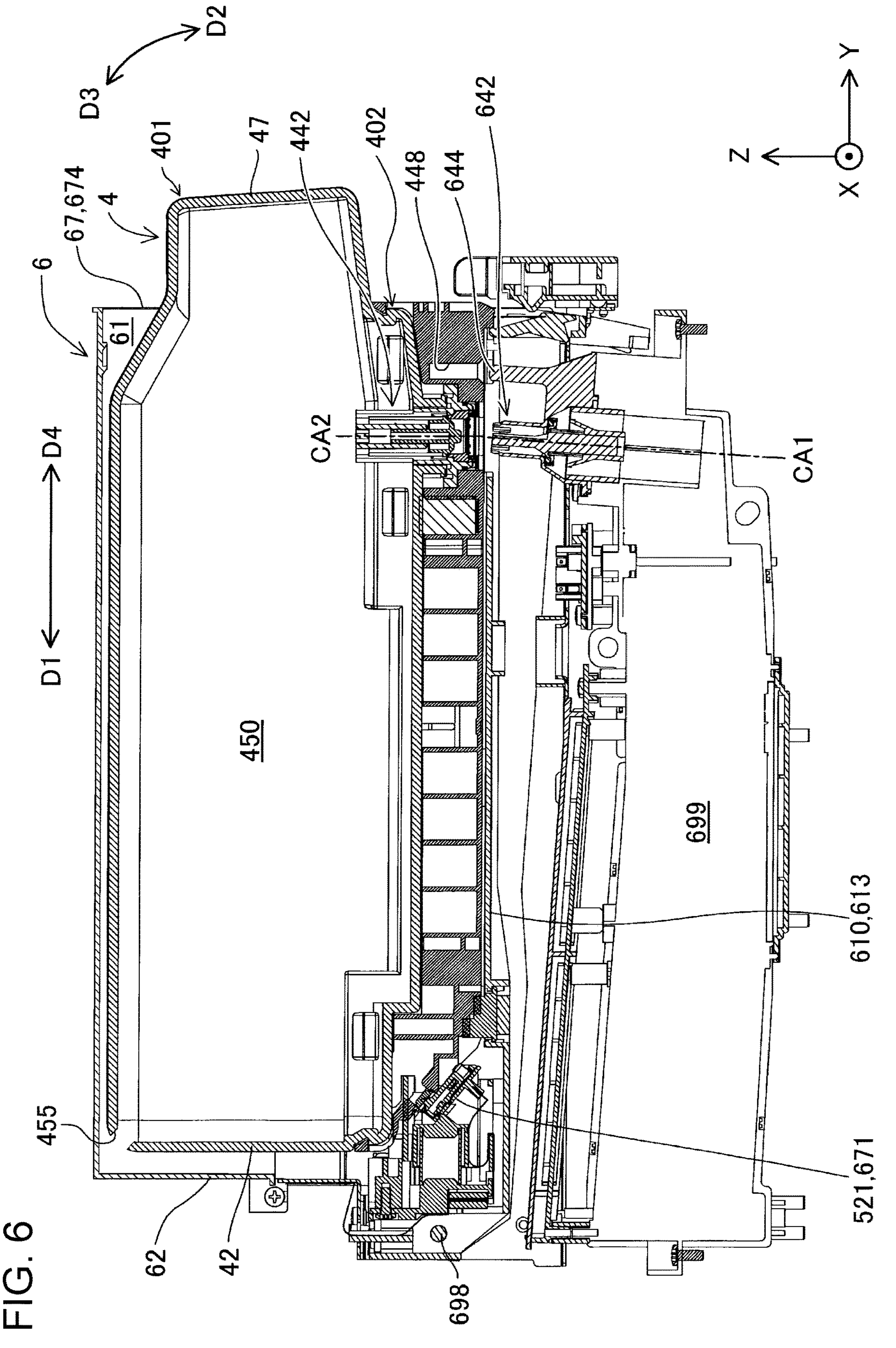
FIG. 6 is a cross-sectional view of the cartridge and the cartridge attachment when a cartridge is in an insertion-completed state.
Figure 7:
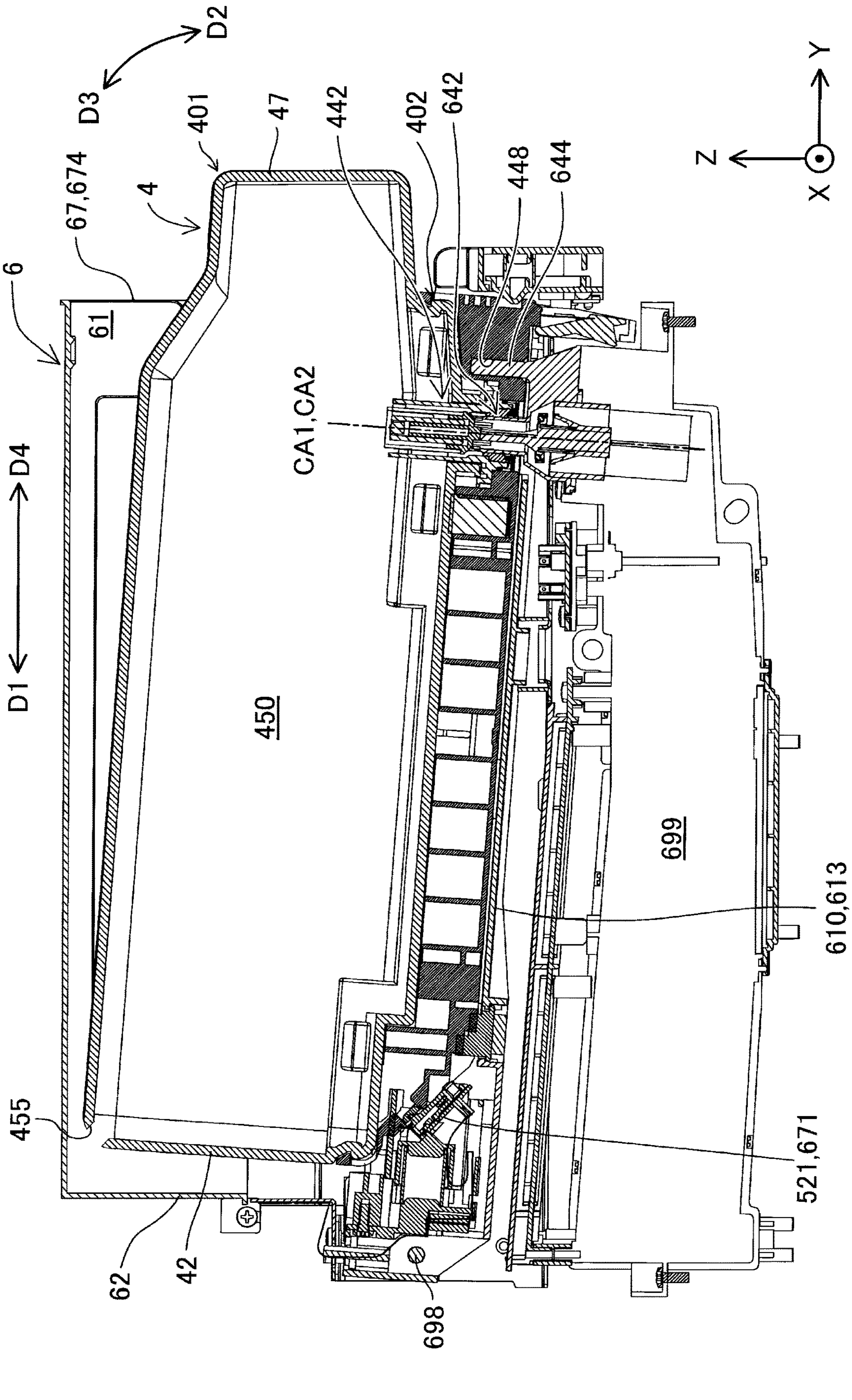
FIG. 7 is a cross-sectional view of the cartridge and the cartridge attachment when the cartridge is in an attached state.

FIG. 6 is a cross-sectional view of the cartridge 4 and the cartridge attachment 6 when a cartridge 4 is in the insertion-completed state; FIG. 7 is a cross-sectional view of the cartridge 4 and the cartridge attachment 6 when the cartridge 4 is in the attached state. FIGS. 6 and 7 each schematically illustrate the Y-Z cross section of the cartridge 4 and the cartridge attachment 6 taken along the introduction section side center axis CA1.

To perform an attaching operation of attaching the cartridge 4 to the cartridge attachment 6, as illustrated in FIG. 6, the cartridge 4 is inserted into the cartridge attachment 6 in the insertion direction D1, the insertion direction D1 being the horizontal direction. More specifically, the cartridge 4 is inserted into the storage chamber 61 in the cartridge attachment 6 in the insertion direction D1, or the −Y direction, via the insertion/removal aperture 674 in the first apparatus wall 67. When reaching a predetermined site inside the cartridge attachment 6, the cartridge 4 enters the insertion-completed state. This predetermined location may be a location at which the cartridge-side terminals 521 in the cartridge 4 come into contact with the respective apparatus-side terminals 671 in the cartridge attachment 6.

After the cartridge 4 has been completely inserted into the cartridge attachment 6, as illustrated in FIG. 7, a rear portion of the cartridge 4 in the insertion direction D1 is moved in a rotation attaching direction D2 containing a gravity-directional component, with a deep side of the cartridge attachment 6 in the insertion direction D1 used as a rotation fulcrum 698. The rear portion of the cartridge 4 in the insertion direction D1 corresponds to a main body rear wall 47 and its surrounding portion of the cartridge 4. In response, the liquid introduction section 642 in the cartridge attachment 6 becomes coupled to the liquid supply section 442 in the cartridge 4 while the electrical contact between the apparatus-side terminals 671 and the respective cartridge-side terminals 521 is maintained. The cartridge 4 thereby enters the attached state. As illustrated in FIG. 5, the cartridge 4 then engages with the engagement forming body 677 disposed on the first apparatus wall 67 in the cartridge attachment 6. As a result, the cartridge 4 is maintained in the attached state.

To perform a detaching operation of detaching the cartridge 4 from the cartridge attachment 6, the rear portion of the cartridge 4 in the insertion direction D1 is first moved in a decoupling direction D3 containing an antigravity-directional component with the deep side of the cartridge attachment 6 in the insertion direction D1 used as the rotation fulcrum 698. During the rotation of the cartridge 4, the engagement between the cartridge 4 and the engagement forming body 677 illustrated in FIG. 5 is released. In response, the cartridge 4 enters the insertion-completed state, as illustrated in FIG. 6. The cartridge 4 is then moved relative to the cartridge attachment 6 in a removal direction D4, which is opposite to the insertion direction D1. As a result, the cartridge 4 becomes detached from the cartridge attachment 6.

A-4. Detailed Configuration of Cartridge

Figure 8:
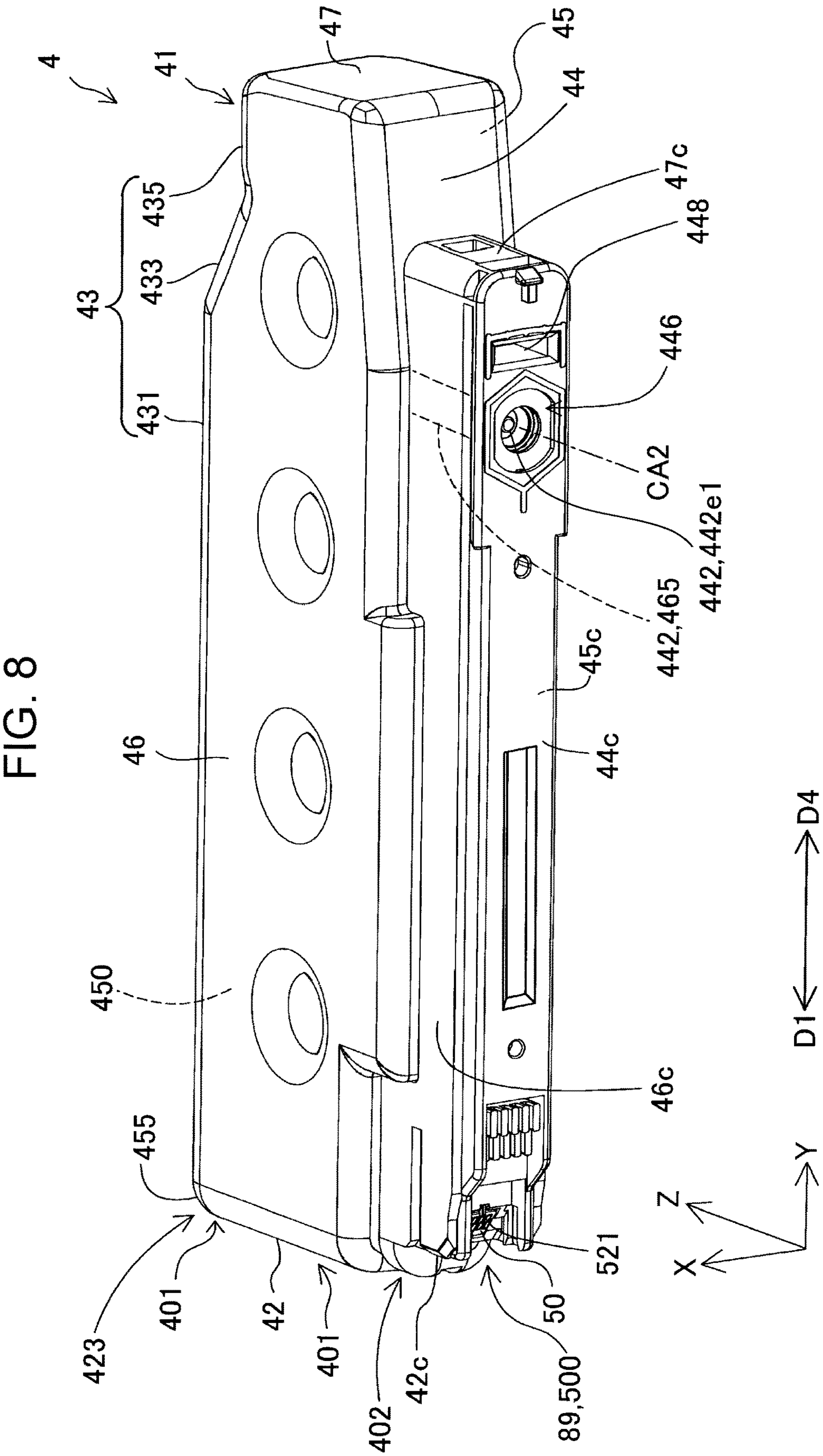
FIG. 8 is a perspective view of a cartridge.

FIG. 8 is a perspective view of a cartridge 4. For the cartridge 4, the X direction is also referred to as the width direction of the cartridge 4, the Y direction is also referred to as the depth direction thereof, and the Z direction is also referred to as the height direction thereof. In FIG. 8 and the subsequent drawings, the X, Y, and Z directions are based on the insertion-completed state of the cartridge 4 as illustrated in FIG. 6. The cartridge 4 may have a substantially rectangular parallelepiped shape. In this embodiment, the outer size of the cartridge 4 in the Y direction is the largest, and the outer size of the cartridge 4 in the Z direction is larger than that in the X direction.

The cartridge 4 includes a liquid reservoir body 401 and an adapter 402.

The liquid reservoir body 401 includes: a main body 41 that forms an outer envelope of the liquid reservoir body 401; the liquid reservoir 450; a liquid inlet 455; and the liquid supply section 442.

The main body 41 includes a main body front wall 42, a main body rear wall 47, a main body top wall 43, a main body bottom wall 44, a main body first side wall 45, and a main body second side wall 46. The main body front wall 42 corresponds to the wall of the main body 41 on its −Y-directional side. The main body rear wall 47 faces the main body front wall 42 in the Y direction and corresponds to the wall of the main body 41 on its +Y-directional side. The main body top wall 43 corresponds to the wall of the main body 41 on its +Z-directional side. The main body top wall 43 includes: an uppermost wall 431 continuing to the main body front wall 42; an inclined wall 433 continuing to the uppermost wall 431; and an end wall 435 continuing to both the inclined wall 433 and the main body rear wall 47. The uppermost wall 431 expands in the insertion direction D1. Among the three walls constituting the main body top wall 43, the uppermost wall 431 is positioned higher in the gravitational direction than any of the inclined wall 433 and the end wall 435 when the cartridge 4 is in the insertion-completed state or the attached state. In addition, among the three walls constituting the main body top wall 43, the uppermost wall 431 is positioned closer to the +Z-directional side of the cartridge 4 than any of the inclined wall 433 and the end wall 435 is when the cartridge 4 is in the insertion-completed state or the attached state. The inclined wall 433 slops up in the insertion direction D1 so that a portion of the inclined wall 433 closer to the main body rear wall 47 is positioned closer to the main body bottom wall 44. The end wall 435 is positioned closer to the −Z-directional side of the main body 41 than any of the uppermost wall 431 and the inclined wall 433, namely, positioned lowest in the gravitational direction when the cartridge 4 is in the insertion-completed state or the attached state. The main body bottom wall 44 faces the main body top wall 43 in the Z direction and corresponds to the wall of the main body 41 on its −Z-directional side. Further, the main body bottom wall 44 is kept in contact with the liquid introduction section 642 when the cartridge 4 is in the insertion-completed state illustrated in FIG. 6. Each of the main body top wall 43 and the main body bottom wall 44 intersects both the main body front wall 42 and the main body rear wall 47. The main body first side wall 45 corresponds to the wall of the main body 41 on its −X-directional side. The main body second side wall 46 faces the main body first side wall 45 in the X direction and corresponds to the wall of the main body 41 on its +X directional side. Each of the main body first side wall 45 and the main body second side wall 46 intersects all of the main body front wall 42, the main body rear wall 47, the main body top wall 43, and the main body bottom wall 44. The main body 41 further includes a reservoir body corner 423 at which the main body front wall 42 positioned at the deep side in the insertion direction D1 intersects the uppermost wall 431 of the main body top wall 43 which intersects the main body front wall 42 and is positioned opposite the main body bottom wall 44 on which the adapter 402 is disposed.

The liquid reservoir 450 is a liquid container that stores the liquid, or the ink, to be supplied to the printing apparatus 10. The liquid reservoir 450 is positioned inside the main body 41. More specifically, the liquid reservoir 450 is disposed inside the inner space defined by the inner walls of the main body 41. As illustrated in FIG. 4, the liquid reservoir 450 has an outflow aperture 432 via which the stored liquid, or the stored ink, is to flow out. The outflow aperture 432 may have a substantially circular shape. In this embodiment, the outflow aperture 432 may be formed in a portion of the main body bottom wall 44 adjacent to the main body rear wall 47, or the +Y directional side of the main body 41.

The liquid inlet 455 is used to pour the liquid, or the ink, into the liquid reservoir 450. Details of the liquid inlet 455 will be described later.

The liquid supply section 442 is a member used to supply the liquid, or the ink, to the liquid introduction section 642 in the cartridge attachment 6. The liquid supply section 442 is inserted into the outflow aperture 432. The liquid supply section 442 extends along a supply section side center axis CA2. The liquid supply section 442 may be a cylindrical member that protrudes from the main body bottom wall 44 to the adapter 402 and extends along the supply section side center axis CA2. In this embodiment, as illustrated in FIG. 6, the supply section side center axis CA2 may be parallel to the Z-axis when the cartridge 4 is in the insertion-completed state. Moreover, as illustrated in FIG. 7, the supply section side center axis CA2 is parallel to the introduction section side center axis CA1 and inclined with respect to the Z-axis when the cartridge 4 is in the attached state. As illustrated in FIG. 4, the liquid supply section 442 includes: a supply end **442*e*1 that forms an end thereof; and a supply base 442*e*2 that forms a base thereof. The supply end 442*e*1 is positioned adjacent to the liquid introduction section 642 while being open when the cartridge 4 is in the insertion-completed state and the attached state. The supply base 442*e*2 is positioned inside the liquid reservoir 450**.

The liquid supply section 442 includes: a supply section flow path 461 along which the liquid, or the ink, flows; a supply section main body 460 that defines the supply section flow path 461; and a cartridge-side valve mechanism 480 that opens/closes in the supply section flow path 461.

The supply section main body 460 forms the outer envelope of the liquid supply section 442. The supply section flow path 461 communicates with the liquid reservoir 450. The cartridge-side valve mechanism 480 is disposed inside the supply section flow path 461. The cartridge-side valve mechanism 480 includes a cartridge-side valve seat 481, the cartridge-side valve body 483, and a cartridge-side biasing member 487. All of the cartridge-side valve seat 481, the cartridge-side valve body 483, and the cartridge-side biasing member 487 are aligned with one another in this order from the supply end **442*e*1 along the supply section side center axis CA2**.

The cartridge-side valve seat 481 is a member that moves to and abuts against the cartridge-side valve body 483 or moves away therefrom. The cartridge-side valve seat 481 is an annular member that may be made of an elastic material, such as a synthetic rubber or an elastomer. The cartridge-side valve seat 481 is disposed with its outer circumferential surface hermetically attached to the inner circumferential surface of the supply section flow path 461. The cartridge-side valve seat 481 is provided with a cartridge-side valve hole 489 that passes therethrough along the supply section side center axis CA2. The cartridge-side valve body 483 is a substantially cylindrical member that extends along the supply section side center axis CA2. The cartridge-side biasing member 487, which may be a compression spring, biases the cartridge-side valve body 483 toward the cartridge-side valve seat 481.

When the liquid introduction section 642 is not coupled to the liquid supply section 442, the supply section flow path 461 is in a closed state. In this case, the cartridge-side valve body 483 abuts against the cartridge-side valve seat 481 by means of the biasing force of the cartridge-side biasing member 487, thereby closing the cartridge-side valve hole 489. As a result, the supply section flow path 461 enters a non-communicating state. When the liquid introduction section 642 is coupled to the liquid supply section 442, the supply section flow path 461 is in an open state. In this case, the cartridge-side valve body 483 is displaced apart from the cartridge-side valve seat 481. In response, the cartridge-side valve mechanism 480 opens, thereby making the supply section flow path 461 enter a communicating state. As a result, the ink stored in the liquid reservoir 450 of the cartridge 4 is supplied to the internal flow path 661 in the liquid introduction section 642 through the liquid supply section 442.

As illustrated in FIGS. 6 and 7, the adapter 402 is a coupling member provided with a mechanism for electrically connecting and physically coupling the liquid reservoir body 401 to the printing apparatus 10. As illustrated in FIG. 8, the adapter 402 is mounted on the main body bottom wall 44 of the liquid reservoir body 401. During the attaching operation of attaching the cartridge 4 to the cartridge attachment 6, the adapter 402 is movable together with the liquid reservoir body 401. The adapter 402 includes: five walls that form the outer envelope of the adapter 402; the cartridge-side supply section positioning unit 448; a terminal placement section 500; a supply section placement chamber 465; and an insertion aperture 446.

The above five walls are an adapter front wall **42*c*, an adapter rear wall 47*c*, an adapter bottom wall 44*c*, an adapter first side wall 45*c*, and an adapter second side wall 46*c*. The adapter front wall 42*c* corresponds to the wall of the adapter 402 on its −Y directional side. The adapter rear wall 47*c* faces the adapter front wall 42*c* in the Y direction and corresponds to the wall of the adapter 402 on its +Y directional side. The adapter bottom wall 44*c* faces the main body bottom wall 44 of the liquid reservoir body 401 in the Z direction. The adapter bottom wall 44*c* intersects both the adapter front wall 42*c* and the adapter rear wall 47*c*. The adapter first side wall 45*c* corresponds to the wall of the adapter 402 on its −X directional side. The adapter second side wall 46*c* faces the adapter first side wall 45*c* in the X direction and corresponds to the wall of the adapter 402 on its +X directional side. Each of the adapter first side wall 45*c* and the adapter second side wall 46*c* intersects all of the adapter front wall 42*c*, the adapter rear wall 47*c*, and the adapter bottom wall 44*c*. Hereinafter, of the surfaces of each of the main body front wall 42*c* and the adapter bottom wall 44*c* to the main body rear wall 47*c*, one that faces the storage chamber 61 of the cartridge attachment 6 when the cartridge 4** is in the attached state is referred to as an outer surface, and the opposite surface is referred to as the inner surface.

As illustrated in FIG. 7, the cartridge-side supply section positioning unit 448 accommodates the apparatus-side positioning section 644 in the cartridge attachment 6. The cartridge-side supply section positioning unit 448 may be a recess depressed from the outer surface toward the inner surface of the adapter bottom wall **44*c***.

As illustrated in FIG. 8, the terminal placement section 500 is disposed at a corner 89 at which the adapter front wall **42*c* intersects the adapter bottom wall 44*c*. The terminal placement section 500 is formed of a circuit board 50. The circuit board 50 has the cartridge-side terminals 521 mounted on the surface thereof that is viewable in FIG. 8 and a memory (not illustrated) mounted on the opposite surface. The cartridge-side terminals 521 are electrically connectable to the respective apparatus-side terminals 671 illustrated in FIG. 2 by coming into contact with the apparatus-side terminals 671. The cartridge-side terminals 521 are electrically connected to the memory via wires. The memory stores information, such as the ink color or the remaining ink amount, regarding the cartridge 4**.

The supply section placement chamber 465 is a room in which the liquid supply section 442 is disposed. The supply section placement chamber 465 is defined and surrounded by the inner surfaces of the adapter bottom wall **44*c*, the adapter first side wall 45*c*, and the adapter second side wall 46*c*. Via the insertion aperture 446, the supply end 442*e*1, which is an end of the liquid supply section 442, is exposed to the outside. The insertion aperture 446 is a through-hole formed from the inner surface to the outer surface of the adapter bottom wall 44*c*. When the adapter bottom wall 44*c* of the cartridge 4 is seen from the −Z directional side, the supply section placement chamber 465, the insertion aperture 446, and the liquid supply section 442 overlap one another. In short, both the supply section placement chamber 465 and the insertion aperture 446 are aligned with each other along the supply section side center axis CA2**.

A-5. Detailed Configuration of Liquid Inlet

Figure 9:
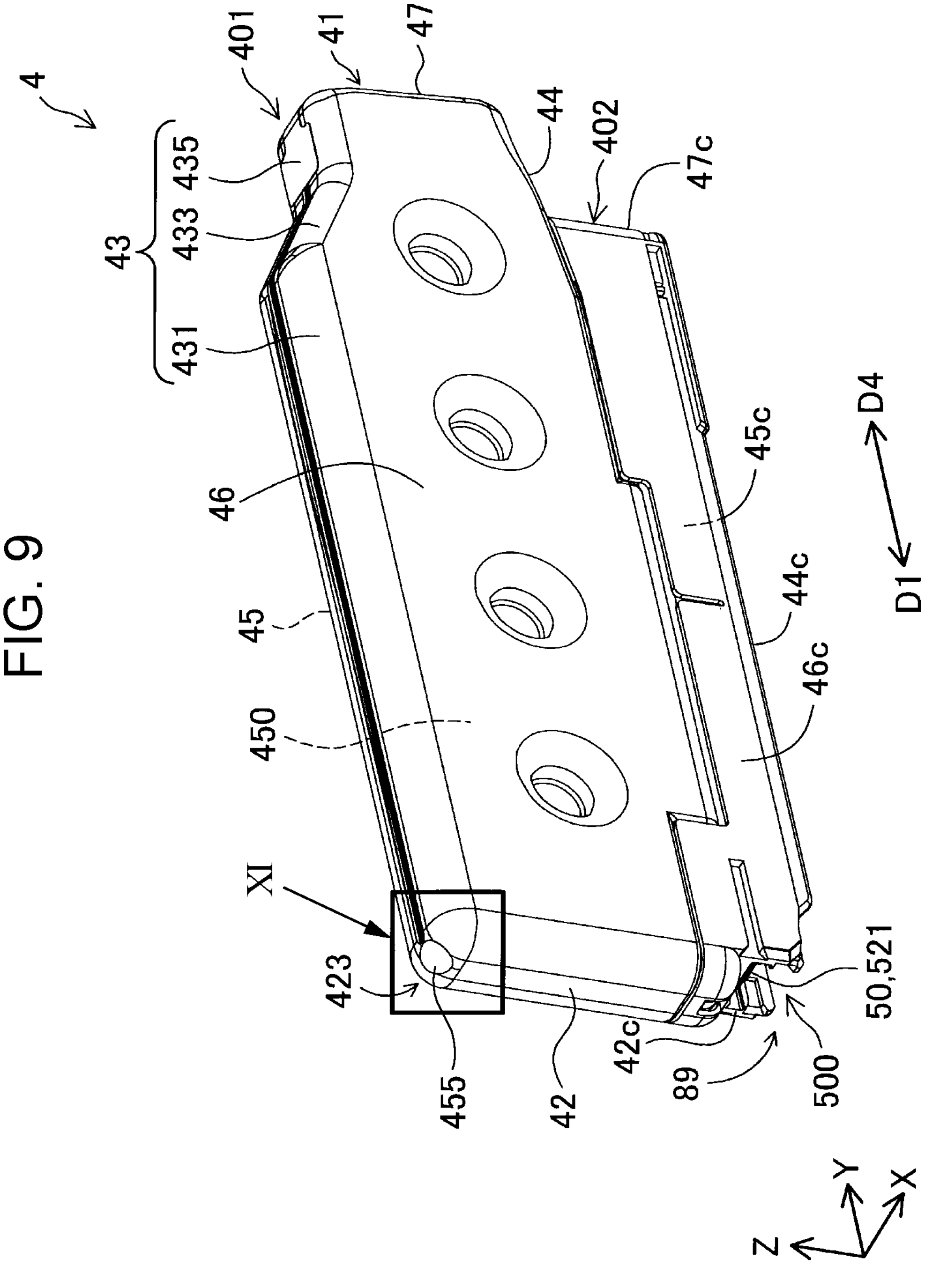
FIG. 9 is a detailed view of the liquid inlet in the cartridge.
Figure 10:
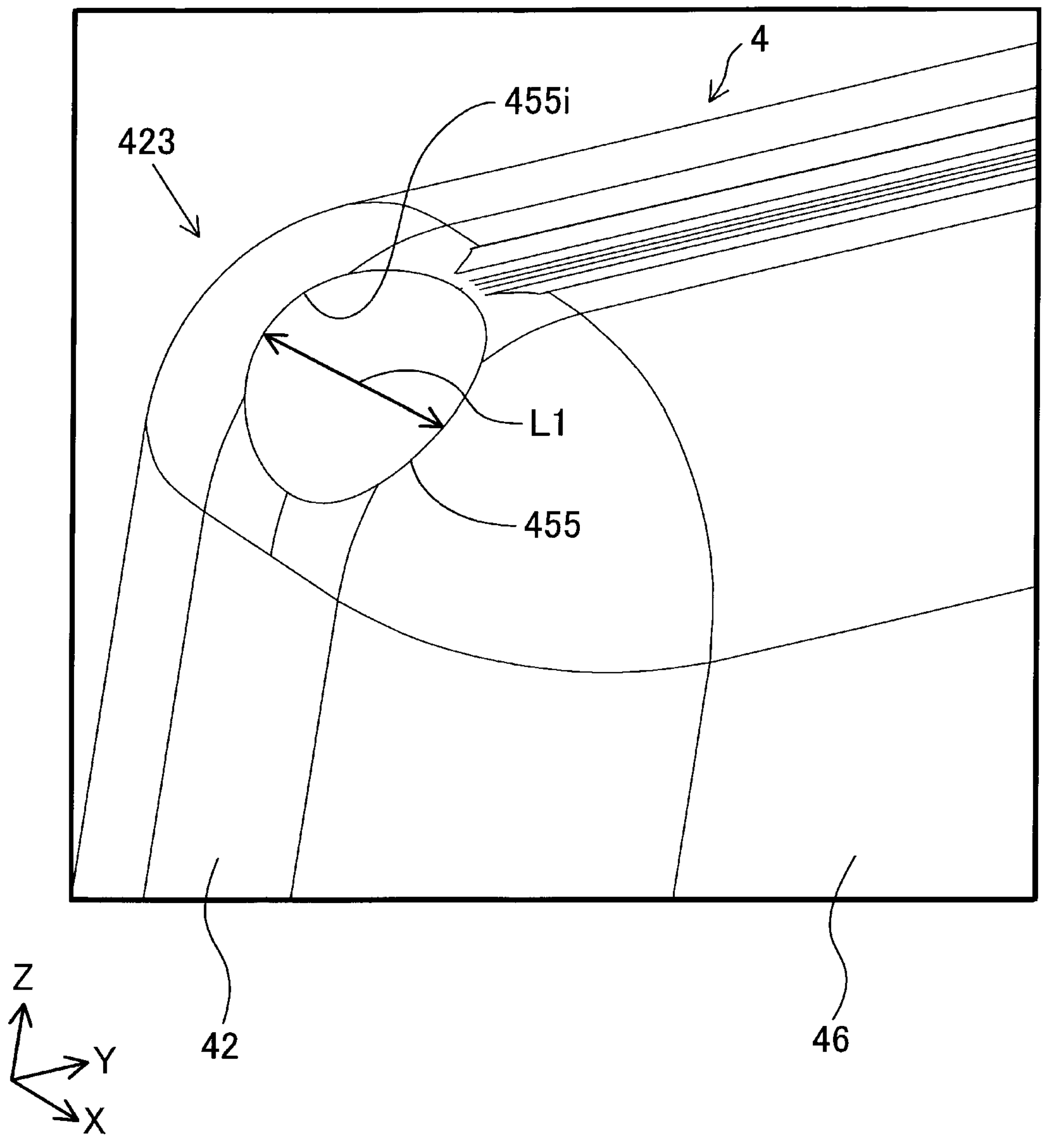
FIG. 10 is an enlarged view of the region XI in FIG. 9.

FIG. 9 is a detailed view of the liquid inlet 455 in the cartridge 4; FIG. 10 is an enlarged view of a region XI in FIG. 9. The liquid inlet 455 is formed across the main body 41 and leads to the interior of the liquid reservoir 450. To pour the ink into the liquid reservoir 450 via the liquid inlet 455, it is necessary to insert an ink pouring member (not illustrated) into the liquid inlet 455. The ink pouring member, which may be a liquid injection needle or tube, is used to supply replenishment ink stored in a liquid container to the outside. Using this ink pouring member can pour the ink into the liquid reservoir 450 without causing the cartridge-side valve mechanism 480 illustrated in FIG. 4 to open.

The outer diameter of the liquid pouring member may be smaller than the diameter L1 of the liquid inlet 455 illustrated in FIG. 10. This configuration can reserve a gap for airflow between an inner surface **455*i* of the liquid inlet 455 and the outer surface of the liquid pouring member when the liquid pouring member is inserted into the liquid inlet 455. As a result, the liquid inlet 455 can serve as a ventilation duct through which the air-liquid exchange is performed in response to the pouring of the ink. In this case, it is unnecessary to form a dedicated ventilation duct in the main body 41** at a location different from that of the liquid inlet 455. Thus, by not forming a dedicated ventilation duct in the main body 41 at a location different from that of the liquid inlet 455, the ink stored in the liquid reservoir 450 can be suppressed from leaking out.

The diameter of the opening end of the liquid pouring member may be larger than the inner diameter L2 of the liquid introduction section 642 illustrated in FIG. 4. If the ink is poured from the liquid supply section 442 into the liquid reservoir 450 by causing the cartridge-side valve mechanism 480 to open, the amount of the ink poured per unit time substantially depends on the inner diameter L2 of the liquid introduction section 642. By setting the diameter of the opening end of the liquid pouring member to be larger than the inner diameter L2 of the liquid introduction section 642, a large amount of ink can be poured into the liquid reservoir 450 in unit time via the liquid inlet 455, compared to the case where it is poured via the liquid supply section 442. To increase the diameter of the opening end of the liquid pouring member, it is necessary to enlarge the outer shape of the liquid pouring member. Moreover, to enlarge the outer shape of the liquid pouring member, it is necessary to increase the diameter L1 of the liquid inlet 455 illustrated in FIG. 10. The diameter L1 of the liquid inlet 455 thus may be set to be larger than the inner diameter L2 of the liquid introduction section 642 illustrated in FIG. 4. In this case, a liquid pouring member having an end aperture with a larger diameter can be inserted into the liquid inlet 455, compared to the case where the diameter L1 of the end aperture of a liquid pouring member is smaller than the inner diameter L2 of the liquid introduction section 642. This configuration thus enables a larger amount of ink to be poured into the liquid reservoir 450 in unit time, in other words, enables a desired amount of ink to be poured in a shorter time.

In this embodiment, the liquid inlet 455 is disposed at the reservoir body corner 423. In this case, when the cartridge 4 is in the insertion-completed state as illustrated in FIG. 6 or the attached state as illustrated in FIG. 7, the liquid inlet 455 is positioned at the highest location in the gravitational direction along the Z-axis. This configuration successfully reduces the risk of the ink stored in the liquid reservoir 450 leaking out via the liquid inlet 455. Furthermore, even when the ink is poured into the liquid reservoir 450 via the liquid inlet 455 until the ink level reaches the upper side of the main body rear wall 47, the configuration successfully reduces the risk of the ink spilling via the liquid inlet 455 because the liquid inlet 455 is positioned higher than this upper side.

According to the foregoing first embodiment, it is possible to pour the liquid, or the ink, into the liquid reservoir 450 via the liquid inlet 455. More specifically, it is possible to pour the ink into the liquid reservoir 450 without causing the cartridge-side valve mechanism 480 to open. This configuration enables efficient pouring of the ink into the liquid reservoir 450 and, when the remaining ink amount becomes equal to or less than a predetermined amount, easy pouring of the ink into the liquid reservoir 450.

According to the foregoing first embodiment, it is possible to pour the ink into the liquid reservoir 450 without causing the cartridge-side valve mechanism 480 in the cartridge 4 to open by inserting a liquid pouring member into the liquid inlet 455 and supplying the ink thereto. This configuration successfully contributes to a simple configuration of a liquid pouring member because the liquid pouring member does not involve using a member for opening the cartridge-side valve mechanism 480.

B. Second Embodiment

Figure 11:
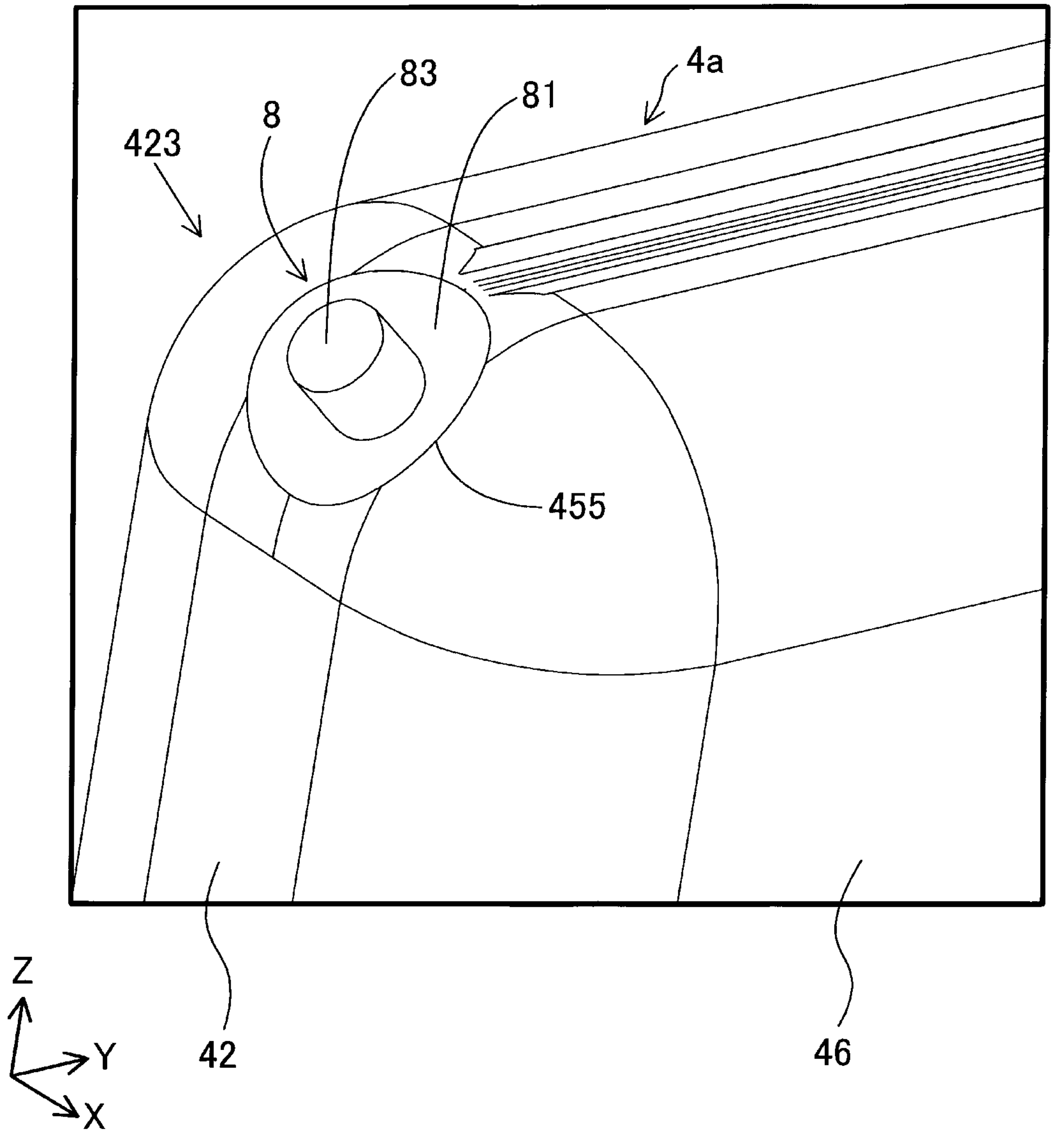
FIG. 11 is a partial perspective view of a liquid inlet in a cartridge into which a plug is fitted, according to a second embodiment of the present disclosure.

FIG. 11 is a partial perspective view of a liquid inlet 455 in a cartridge 4*a* into which a plug 8 is fitted. In FIG. 11, the X, Y, and Z directions are based on the insertion-completed state of the cartridge 4*a* as illustrated in FIG. 6. In this embodiment, the cartridge 4*a* is provided with the plug 8 to be fitted into the liquid inlet 455. Other configurations are identical to those in the foregoing first embodiment. The components identical to those in the first embodiment are given the same reference characters and will not be described.

Figure 12:
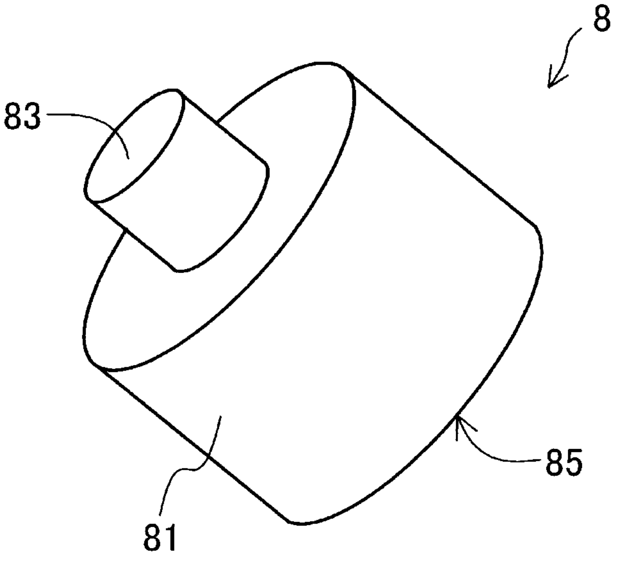
FIG. 12 is a first perspective view of the plug according to the second embodiment.
Figure 13:
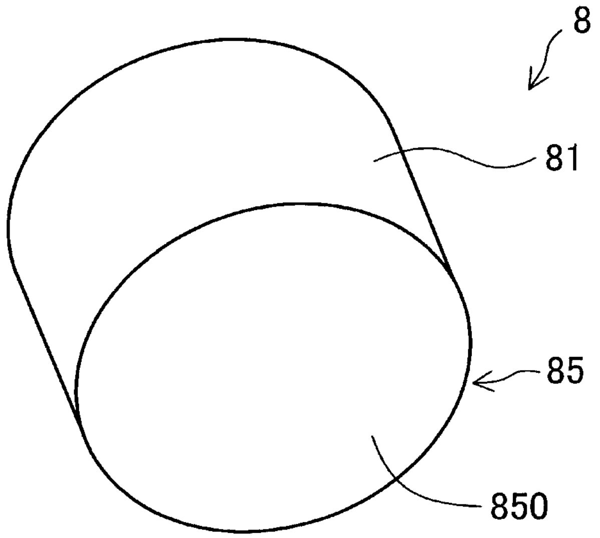
FIG. 13 is a second perspective view of the plug according to the second embodiment.
Figure 14:
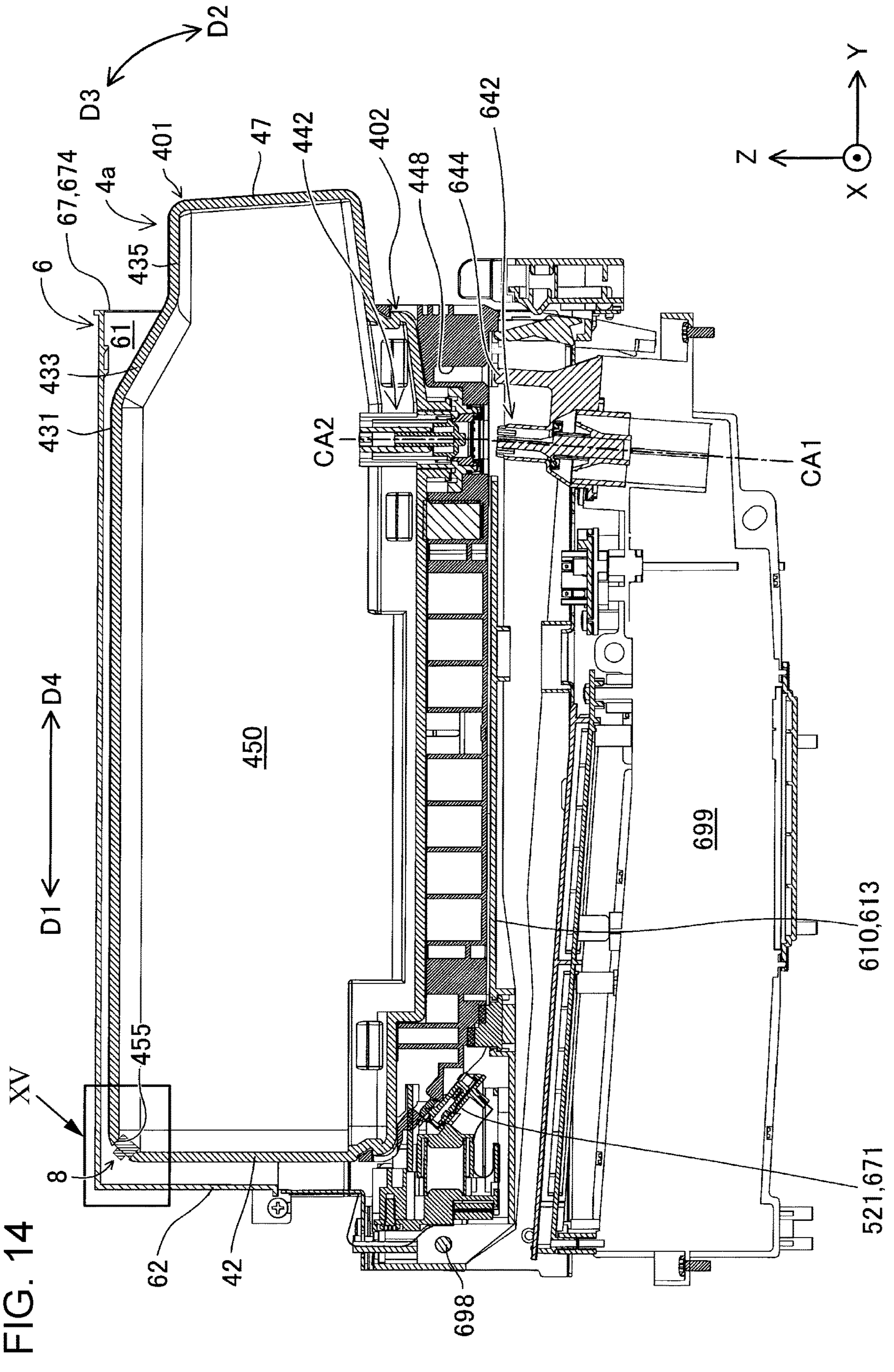
FIG. 14 is a first cross-sectional view of the cartridge and the cartridge attachment when the cartridge is in the attached state.
Figure 15:
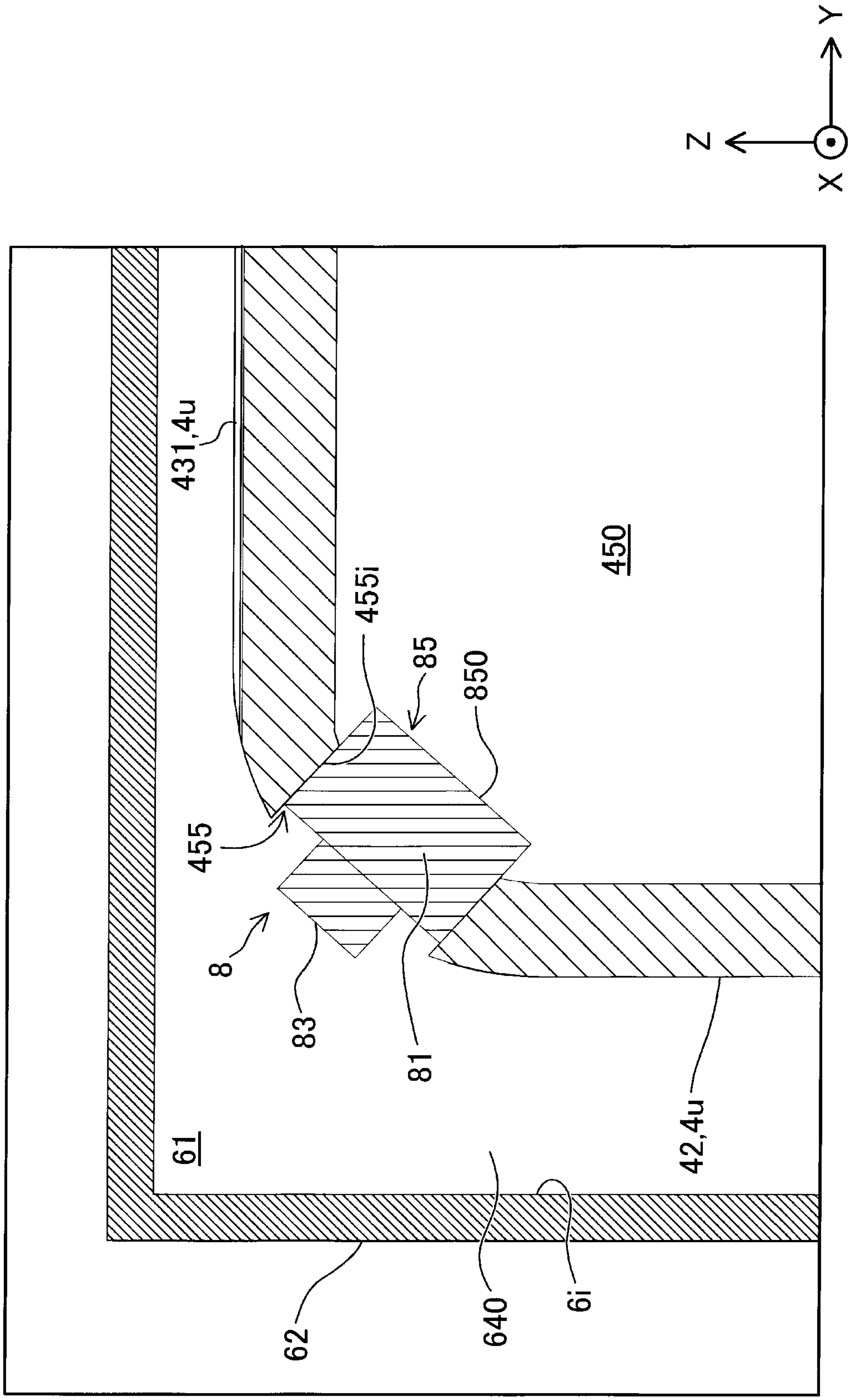
FIG. 15 is an enlarged view of the region XV in FIG. 14.
Figure 16:
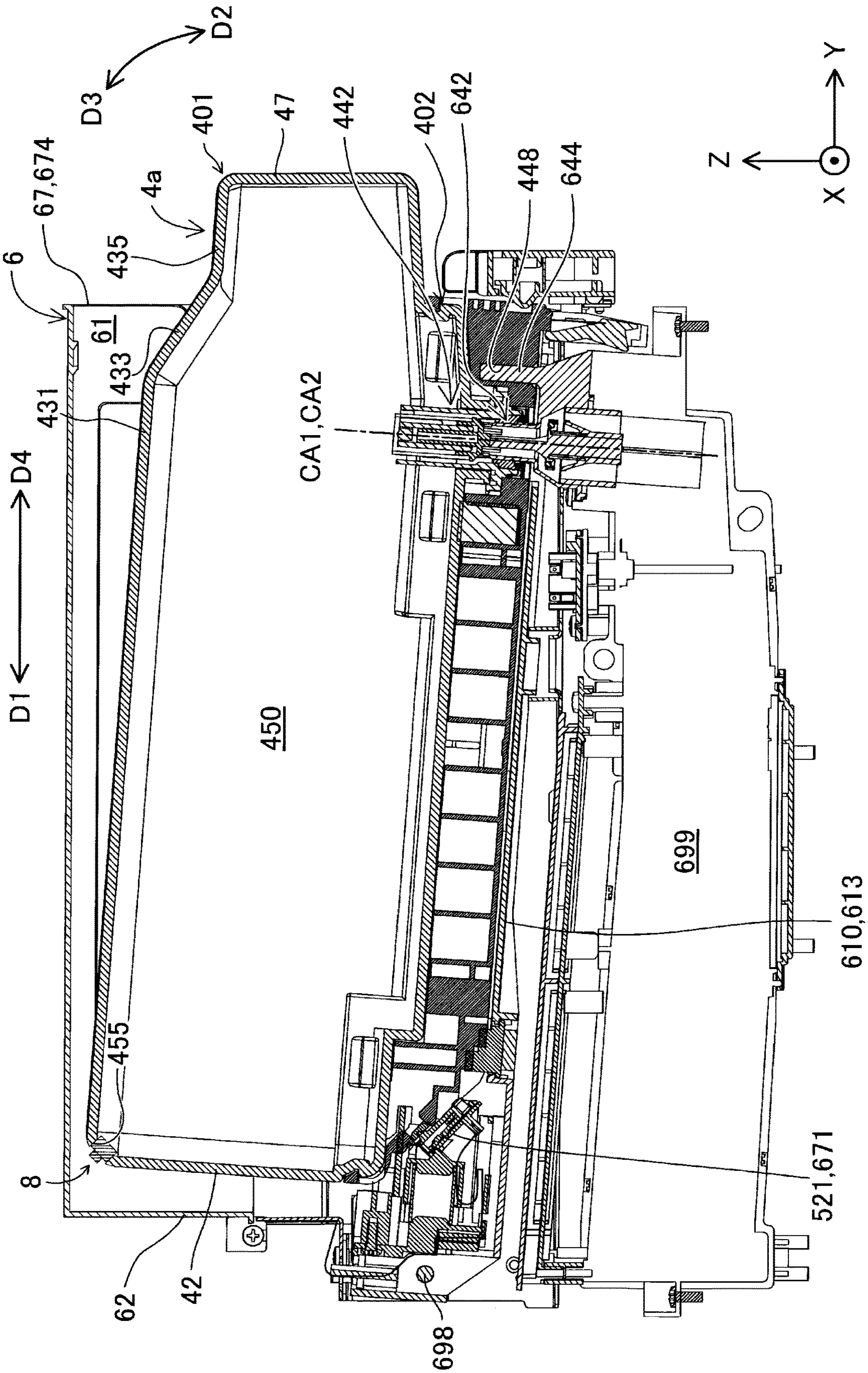
FIG. 16 is a second cross-sectional view of the cartridge and the cartridge attachment when the cartridge is in the attached state.

FIG. 12 is a first perspective view of the plug 8 according to the second embodiment; FIG. 13 is a second perspective view of the plug 8 according to the second embodiment; FIG. 14 is a first cross-sectional view of the cartridge 4*a* in which the plug 8 is fitted into the liquid inlet 455 and a cartridge attachment 6 when the cartridge 4*a* is in the insertion-completed state; FIG. 15 is an enlarged view of a region XV in FIG. 14; and FIG. 16 is a second cross-sectional view of the cartridge 4*a* and the cartridge attachment 6 when the cartridge 4*a* is in the attached state. FIGS. 14 to 16 each schematically illustrate the Y-Z cross section of the cartridge 4*a* taken along the introduction section side center axis CA1.

The plug 8 is removably fitted into the liquid inlet 455. As illustrated in FIG. 12, the plug 8 has a plug body 81, a plug top 83, and a plug bottom 85. As illustrated in FIGS. 11 and 15, the plug body 81 closes the liquid inlet 455 by coming into contact with an inner surface 455*i* of the liquid inlet 455. The outer circumferential shape of the plug body 81 is similar to the inner circumferential shape of the inner surface 455*i* of the liquid inlet 455. The plug top 83 may be a projection that protrudes from the plug body 81. When the plug 8 is fitted into the liquid inlet 455, the plug top 83 is positioned so as to protrude toward the inner surface of a storage chamber 61. The plug top 83 is a section of the plug 8 to be grabbed by a user when he/she fits the plug 8 into the liquid inlet 455 or when he/she removes it therefrom. Providing the plug top 83 for the plug 8 helps the user fit the plug 8 into the liquid inlet 455 and remove it therefrom. When the plug 8 is fitted into the liquid inlet 455, the plug bottom 85 is positioned so as to face the interior of a liquid reservoir 450. The plug bottom 85 has a plug bottom surface 850 that faces the interior of a liquid reservoir 450 when the plug 8 is fitted into the liquid inlet 455. In this embodiment, as illustrated in FIG. 13, the plug bottom surface 850 may have a flat shape.

The plug 8 may be made of an elastic material, such as a synthetic rubber. Using the plug 8 made of an elastic material allows the plug 8 to be easily fitted into/removed from the liquid inlet 455 and to be repeatedly fitted into/removed from the liquid inlet 455 with a low risk of damage to the liquid inlet 455.

As illustrated in FIGS. 14 and 16, the plug 8 is configured not to interfere with the cartridge attachment 6 during the attaching operation. More specifically, as illustrated in FIG. 15, when the cartridge 4*a* is attached to the cartridge attachment 6, the outer shape of the plug top 83 protruding outwardly from the cartridge 4*a* via the liquid inlet 455 is smaller than a gap 640 between the cartridge 4*a* and the cartridge attachment 6. In other words, the amount in which the plug 8 protrudes from the cartridge 4*a* via the liquid inlet 455 is smaller than the clearance between an outer wall 4*u* of the cartridge 4*a* and an inner wall 6*i* of the cartridge attachment 6 which forms the storage chamber 61. This configuration successfully suppresses the plug 8 from disturbing the attaching/detaching of the cartridge 4*a* to or from the cartridge attachment 6.

According to the foregoing second embodiment, as illustrated in FIG. 11, a plug 8 is used to cover a liquid inlet 455.

It is therefore possible to reduce the risk of the ink stored in a liquid reservoir 450 leaking out via the liquid inlet 455.

At least a portion of the outer shape of the plug 8 depends on the diameter L1 of the liquid inlet 455. Thus, the diameter L1 of the liquid inlet 455 illustrated in FIG. 10 needs to be equal to or less than a predetermined upper limit. The upper limit of the diameter L1 of the liquid inlet 455 may be preset so that the plug 8 does not disturb the attaching/detaching of the cartridge 4*a* to or from the cartridge attachment 6 during the attaching operation.

C. Third Embodiment

Figure 17:
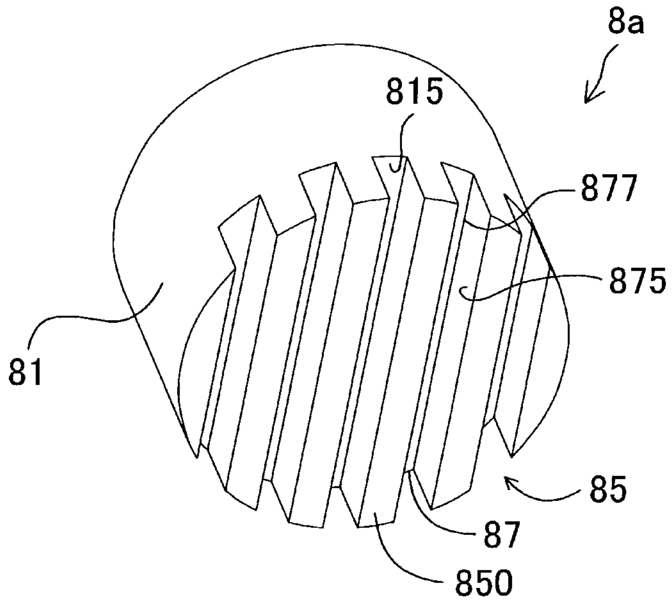
FIG. 17 is a perspective view of a plug according to a third embodiment of the present disclosure.

FIG. 17 is a perspective view of a plug 8*a* according to a third embodiment of the present disclosure. In this embodiment, the plug 8*a* has a plug bottom 85 with a plurality of grooves 87. Other configurations are identical to those in the foregoing first embodiment. The components identical to those in the foregoing second embodiment are given the same reference characters and will not be described.

The grooves 87 are formed so as to be depressed from a plug bottom surface 850 to a plug body 81; the plug bottom surface 850 is a portion of the plug bottom 85 which is positioned closest to a liquid reservoir 450 when the plug 8*a* is fitted into a liquid inlet 455. In this embodiment, the grooves 87 are formed parallel to one another on the plug bottom 85 at predetermined intervals. Each of the grooves 87 is rectangular and has, as its bottom surface, a boundary surface 815 formed between the plug body 81 and the plug bottom 85. Each groove 87 has a plurality of groove corners 877, each of which is formed between the ridge lines by its bottom surface, or the boundary surface 815, and its side surface, or a groove side surface 875. Each of the groove corners 877 retains the liquid, or the ink, by means of its capillary force. The number, shape, and locations of grooves 87 are not limited to those in this embodiment.

According to the foregoing third embodiment, a plug 8*a* has a plug bottom 85 on which a plurality of grooves 87 are arranged so as to face a liquid reservoir 450 when the plug 8*a* is fitted into a liquid inlet 455. Each of the grooves 87 has a plurality of groove corners 877 that can retain the ink by means of its capillary force. This configuration successfully reduces the risk of ink droplets flying from the plug bottom 85 and adhering to some sites on and around the cartridge 4*a* when the plug 8*a* is removed from the liquid inlet 455.

D. Modifications

D-1: Modification 1

In modification 1, a cartridge 4 or 4*a* may include, aside from a liquid inlet 455, a ventilation duct through which a liquid reservoir 450 communicates with the outside. In this case, when the ink is poured into the liquid reservoir 450 via the liquid inlet 455, the air-liquid exchange may be performed in the liquid reservoir 450 through the ventilation duct. This ventilation duct may be disposed at a location different from that of the liquid supply section 442. For example, the ventilation duct is disposed in one of a main body front wall 42, a main body top wall 43, a main body bottom wall 44, a main body first side wall 45, a main body second side wall 46, and a main body rear wall 47 of the main body 41 which constitute the liquid reservoir 450. According to this modification, no gap is needed to pass air between an inner surface 455*i* of a liquid inlet 455 and the outer surface of a liquid pouring member. Therefore, by causing the air-liquid exchange to be performed in a liquid reservoir 450 through a ventilation duct disposed at a location different from that of the liquid inlet 455, the liquid pouring member having an end aperture with a large diameter can be used, compared to the case where the air-liquid exchange is performed via a gap formed between the inner surface 455*i* of the liquid inlet 455 and the outer surface of the liquid filing member. It is consequently possible to pour a larger amount of ink into the liquid reservoir 450 in unit time, namely, to pour the ink efficiently.

D-2: Modification 2

In modification 2, a cartridge 4 or 4*a* may be provided with two or more liquid inlets 455. According to this modification, the ink can be simultaneously poured into a liquid reservoir 450 through the two or more liquid inlets 455. It is consequently possible to pour a large amount of ink into the liquid reservoir 450 in unit time, namely, to pour the ink efficiently.

D-3: Modification 3

In the foregoing first and second embodiments, as illustrated in FIG. 9, a liquid inlet 455 is formed in a cartridge 4 or 4*a* at a reservoir body corner 423; however, the location of the liquid inlet 455 formed is not limited. In modification 3, the liquid inlet 455 may be formed in one of a main body front wall 42, a main body top wall 43, a main body bottom wall 44, a main body first side wall 45, a main body second side wall 46, and a main body rear wall 47 of the main body 41 which constitute the liquid reservoir 450. For example, the liquid inlet 455 is formed in the uppermost wall 431. If the liquid inlet 455 is formed in the uppermost wall 431, the liquid inlet 455 can easily be positioned higher in the gravitational direction, or Z direction, than the ink level in the liquid reservoir 450 when the cartridge 4 or 4*a* is in the insertion-completed state or the attached state. This configuration successfully reduces the risk of the ink stored in the liquid reservoir 450 leaking out via the liquid inlet 455. Likewise, if the liquid inlet 455 is formed in a wall of the main body 41 other than the uppermost wall 431, namely, one of the main body front wall 42, the main body bottom wall 44, the main body first side wall 45, the main body second side wall 46, an inclined wall 433, and an end wall 435, it is also possible to reduce the risk of the ink stored in the liquid reservoir 450 leaking out via the liquid inlet 455, for example, by fitting a plug 8 into the liquid inlet 455.

D-4. Modification 4

In modification 4, a diameter L1 of a liquid inlet 455 illustrated in FIG. 10 may be equal to or shorter than an inner diameter L2 of a liquid introduction section 642 illustrated in FIG. 4. This configuration also successfully pours the ink into a liquid reservoir 450 without causing a cartridge-side valve mechanism 480 in a cartridge 4 or 4*a* to open. It is consequently possible to pour the ink efficiently, compared to the case where the ink is poured through the liquid supply section 442.

D-5. Modification 5

In modification 5, a cartridge 4*a* does not necessarily have to be provided with a plug 8 or 8*a*. In this case, a liquid inlet 455 may be formed higher in the gravitational direction than the ink level in a liquid reservoir 450 when a cartridge 4*a* is in the insertion-completed state or the attached state. This configuration successfully reduces the risk of the ink stored in the liquid reservoir 450 leaking out via the liquid inlet 455 without fitting a plug 8 or **8*a* into a liquid inlet 455**.

D-6. Modification 6

In modification 6, a plug 8 or **8*a* may have a slit that can be widened when a liquid pouring member is pressed against the plug 8 or 8*a*. It is consequently possible to pour the ink into a liquid reservoir 450 via a liquid inlet 455 without removing the plug 8 or 8*a* from the liquid inlet 455**.

D-7. Modification 7

In modification 7, a liquid reservoir body 401 and an adapter 402 may be integrally molded by a flow molding process.

F. Other Modifications

The present disclosure is not limited to the foregoing first to third embodiments and modifications 1 to 7. Technical features in the first to third embodiments and modifications 1 to 7 which are related to those in the aspects in Summary may be replaced or combined as appropriate for the purpose of addressing all or some of the above problems or achieving all or some of the above effects. Moreover, some technical features that are not described as essential herein can be deleted as appropriate.

According to a first aspect of the present disclosure, a cartridge is to be detachably attached to a cartridge attachment in a printing apparatus. The cartridge is attached to the cartridge attachment through an attaching operation in which the cartridge is completely inserted into the cartridge attachment in an insertion direction, the insertion direction being a horizontal direction, and then a rear portion of the cartridge in the insertion direction is moved in a rotation attaching direction containing a gravity-directional component with a deep side of the cartridge in the insertion direction used as a rotation fulcrum. This cartridge includes: a main body that forms an outer envelope; a liquid reservoir that stores liquid to be supplied to the printing apparatus, a liquid reservoir being disposed inside the main body; a liquid inlet formed across the main body, the liquid inlet leading to an interior of the liquid reservoir; a liquid reservoir body that includes a liquid supply section through which the liquid is to be supplied to a liquid introduction section in the cartridge attachment, the liquid supply section communicating with the liquid reservoir; and an adapter mounted on the liquid reservoir body, the adapter having an insertion aperture into which the liquid introduction section is to be inserted.

With the first aspect, a liquid can be poured into a liquid reservoir via a liquid inlet without causing a valve mechanism in a liquid supply section to open. It is consequently possible to efficiently pour the liquid into the liquid reservoir.

According to a second aspect of the present disclosure, when the cartridge is in an attached state where the cartridge is attached to the cartridge attachment, the main body may have a front wall positioned on a deep side of the main body in the insertion direction, a top wall that intersects the front wall and that is positioned on a side opposite to a side on which the adapter is disposed, and a reservoir body corner at which the front wall intersects the top wall. The liquid inlet may be formed at the reservoir body corner.

With the second aspect, the liquid inlet may be able to be positioned at the highest location in the gravitational direction during the attaching operation for the cartridge. It may be consequently possible to reduce the risk of the ink stored in the liquid reservoir leaking out via the liquid inlet.

According to a third aspect of the present disclosure, a diameter of the liquid inlet may be larger than an inner diameter of the liquid introduction section.

With the third aspect, a large amount of ink may be able to be poured into the liquid reservoir in unit time via the liquid inlet, compared to the case where the ink is poured via the liquid supply section by causing the valve mechanism in the liquid supply section to open. It may be consequently possible to further efficiently pour the liquid into the liquid reservoir.

According to a fourth aspect of the present disclosure, the cartridge may further include a plug that covers the liquid inlet, the plug being configured not to interfere with the cartridge attachment during the attaching operation.

With the fourth aspect, it may be possible to reduce the risk of the liquid stored in the liquid reservoir leaking out via the liquid inlet without interfering with the attaching operation of attaching the cartridge to the cartridge attachment.

According to the fifth aspect, the plug may have a plug bottom that is positioned to face the liquid reservoir when the plug is fitted into the liquid inlet. The plug bottom may have a groove.

With the fifth aspect, at least some of the liquid adhering to the plug bottom may be able to be retained by a groove. It may be consequently possible to reduce the risk of ink droplets flying from the plug bottom and adhering to some sites on and around the cartridge when the plug is removed from the liquid inlet.

According to the sixth aspect, the plug may be made of an elastic material.

With the sixth aspect, a plug made of an elastic material may be able to be used. It may be consequently possible to easily fit/remove the plug to or from the liquid inlet and to repeatedly fit/remove the plug into or from the liquid inlet with a low risk of damage.

Not all the components in the aspects of the present disclosure are essential. To address some or all of the above problems or to achieve some or all of the effects described herein, some of such components can undergo various changes, deletions, and/or replacements with new other ones, as appropriate, and some limitations thereof can be deleted. Moreover, to address some or all of the above problems or to achieve some or all of the effects described herein, it is also possible to combine some or all of the technical features included in one aspect of the present disclosure described above with some or all of the technical features included in another aspect of the disclosure described above to conceive of an independent aspect of the present disclosure.

The present disclosure can be implemented in various aspects other than cartridges. For example, the present disclosure can be implemented in the aspect of a printing apparatus equipped with a cartridge, a method of manufacturing a cartridge, or a method of pouring a liquid into a cartridge.

What is claimed is:

1. A cartridge to be detachably attached to a cartridge attachment in a printing apparatus, the cartridge being attached to the cartridge attachment through an attaching operation in which the cartridge is completely inserted into the cartridge attachment in an insertion direction, the insertion direction being a horizontal direction, and then a rear portion of the cartridge in the insertion direction is moved in a rotation attaching direction containing a gravity-directional component with a deep side of the cartridge in the insertion direction used as a rotation fulcrum, the cartridge comprising:

a main body that forms an outer envelope;

a liquid reservoir that stores liquid to be supplied to the printing apparatus, the liquid reservoir being disposed inside the main body;

a liquid inlet formed across the main body, the liquid inlet leading to an interior of the liquid reservoir;

a liquid reservoir body that includes a liquid supply section through which the liquid is to be supplied to a liquid introduction section in the cartridge attachment, the liquid supply section communicating with the liquid reservoir; and an adapter mounted on the liquid reservoir body, the adapter having an insertion aperture into which the liquid introduction section is to be inserted, wherein when the cartridge is in an attached state where the cartridge is attached to the cartridge attachment, the main body has a front wall positioned on a deep side of the main body in the insertion direction, a top wall that intersects the front wall and that is positioned on a side opposite to a side on which the adapter is disposed, and a reservoir body corner at which the front wall intersects the top wall, and the liquid inlet is formed at the reservoir body corner.

2. The cartridge according to claim 1, wherein a diameter of the liquid inlet is larger than an inner diameter of the liquid introduction section.

3. A cartridge to be detachably attached to a cartridge attachment in a printing apparatus, the cartridge being attached to the cartridge attachment through an attaching operation in which the cartridge is completely inserted into the cartridge attachment in an insertion direction, the insertion direction being a horizontal direction, and then a rear portion of the cartridge in the insertion direction is moved in a rotation attaching direction containing a gravity-directional component with a deep side of the cartridge in the insertion direction used as a rotation fulcrum, the cartridge comprising:

a main body that forms an outer envelope;

a liquid reservoir that stores liquid to be supplied to the printing apparatus, the liquid reservoir being disposed inside the main body;

a liquid inlet formed across the main body, the liquid inlet leading to an interior of the liquid reservoir;

a liquid reservoir body that includes a liquid supply section through which the liquid is to be supplied to a liquid introduction section in the cartridge attachment, the liquid supply section communicating with the liquid reservoir;

an adapter mounted on the liquid reservoir body, the adapter having an insertion aperture into which the liquid introduction section is to be inserted; and a plug that covers the liquid inlet, the plug being configured not to interfere with the cartridge attachment during the attaching operation.

4. The cartridge according to claim 3, wherein the plug has a plug bottom that is positioned to face the liquid reservoir when the plug is fitted into the liquid inlet, and the plug bottom has a groove.

5. The cartridge according to claim 3, wherein the plug is made of an elastic material.

* * * * *